(12) United States Patent
Radakovitz et al.

(10) Patent No.: US 11,080,474 B2
(45) Date of Patent: Aug. 3, 2021

(54) CALCULATIONS ON SOUND ASSOCIATED WITH CELLS IN SPREADSHEETS

(71) Applicant: Microsoft Technology Licensing, LLC., Redmond, WA (US)

(72) Inventors: Samuel C. Radakovitz, Seattle, WA (US); Christian M. Canton, Bellevue, WA (US); Carlos A. Ortero, Seattle, WA (US); John Campbell, Woodinville, WA (US); Allison Rutherford, Seattle, WA (US); Benjamin E. Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/340,874

(22) Filed: Nov. 1, 2016

(65) Prior Publication Data

US 2017/0124056 A1 May 4, 2017

Related U.S. Application Data

(60) Provisional application No. 62/357,284, filed on Jun. 30, 2016, provisional application No. 62/357,292, (Continued)

(51) Int. Cl.
*G06F 3/16* (2006.01)
*G06F 40/18* (2020.01)
(Continued)

(52) U.S. Cl.
CPC ............ *G06F 40/18* (2020.01); *G06F 3/0482* (2013.01); *G06F 3/04817* (2013.01);
(Continued)

(58) Field of Classification Search
CPC ........ G06F 3/165; G06F 3/167; G06F 16/489; G06F 17/246; G10L 13/00; G10L 13/08
See application file for complete search history.

(56) References Cited

U.S. PATENT DOCUMENTS 5,717,939 A 2/1998 Bricklin et al.
5,850,629 A * 12/1998 Holm ..................... G06F 3/16
704/260

(Continued)

FOREIGN PATENT DOCUMENTS

CN 101796829 A 8/2010
CN 102842323 A 12/2012
(Continued)

OTHER PUBLICATIONS

PCT International Search Report and Written Opinion in PCT/US2016/060180, dated Jul. 12, 2017, 22 pages.
(Continued)

*Primary Examiner* — Maikhanh Nguyen
(74) *Attorney, Agent, or Firm* — NovoTechIP International, PLLC

(57) ABSTRACT

Described herein is a system and method for associating audio files with one or more cells in a spreadsheet application. As described, one or more audio files may be associated with a single cell in a spreadsheet application or it may be associated with a range of cells in the spreadsheet application. Information about the audio file, such playback properties and other parameters, may be retrieved from the audio file. Once retrieved, a calculation engine of the spreadsheet application may perform one or more calculations on the information in order to change the content of audio file, the playback of the audio files and so on.

18 Claims, 9 Drawing Sheets

Related U.S. Application Data filed on Jun. 30, 2016, provisional application No. 62/249,869, filed on Nov. 2, 2016, provisional application No. 62/249,884, filed on Nov. 2, 2016.

(51) Int. Cl.

| | | |
|---|---|---|
| *G06F 40/106* | (2020.01) | |
| *G06F 40/177* | (2020.01) | |
| *G06F 40/197* | (2020.01) | |
| *G06F 3/0484* | (2013.01) | |
| *G06T 11/60* | (2006.01) | |
| *G06F 3/0482* | (2013.01) | |
| *G06F 3/0488* | (2013.01) | |
| *G06F 3/0481* | (2013.01) | |
| *G06T 11/20* | (2006.01) | |
| *G10L 15/26* | (2006.01) | |
| *G06K 9/00* | (2006.01) | |
| *G10L 13/033* | (2013.01) | |
| *G11B 27/00* | (2006.01) | |
| *G06T 1/00* | (2006.01) | |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 40/106* (2020.01); *G06F 40/177* (2020.01); *G06F 40/197* (2020.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(56) References Cited

U.S. PATENT DOCUMENTS

| | | | |
|---|---|---|---|
| 5,860,064 A | | 1/1999 | Henton |
| 6,055,549 A | | 4/2000 | Takano |
| 6,065,013 A | | 5/2000 | Fuh et al. |
| 6,138,130 A | | 10/2000 | Adler et al. |
| 6,262,736 B1 | | 7/2001 | Nelson |
| 6,289,312 B1 | | 9/2001 | Raman |
| 6,377,965 B1 | | 4/2002 | Hachamovitch et al. |
| 6,415,305 B1 | | 7/2002 | Agrawal et al. |
| 6,496,832 B2 | | 12/2002 | Chi et al. |
| 6,640,234 B1 | | 10/2003 | Coffen |
| 6,701,485 B1 | | 3/2004 | Igra et al. |
| 6,779,151 B2 | | 8/2004 | Cahill et al. |
| 6,785,660 B1 | | 8/2004 | Fedor et al. |
| 6,988,241 B1 | | 1/2006 | Guttman et al. |
| 6,988,248 B1 | | 1/2006 | Tang |
| 7,047,484 B1 | | 5/2006 | Becker et al. |
| 7,138,575 B2 | | 11/2006 | Childs et al. |
| 7,350,141 B2 | | 3/2008 | Kotler et al. |
| 7,424,668 B2 | | 9/2008 | DeSpain |
| 7,430,709 B2 | | 9/2008 | Cho |
| 7,451,397 B2 | | 11/2008 | Weber et al. |
| 7,594,172 B2 | | 9/2009 | Fish |
| 7,639,873 B2 | | 12/2009 | Qian |
| 7,647,551 B2 | | 1/2010 | Vigesaa et al. |
| 7,761,782 B1 | | 7/2010 | Warren et al. |
| 7,849,395 B2 | | 12/2010 | Ellis et al. |
| 7,853,867 B2 | * | 12/2010 | Egilsson .......... G06F 8/34 715/212 |
| 7,885,811 B2 | | 2/2011 | Zimmerman et al. |
| 7,962,436 B2 | | 6/2011 | Brelage et al. |
| 8,091,024 B2 | | 1/2012 | Graeber |
| 8,121,842 B2 | | 2/2012 | Shih et al. |
| 8,145,999 B1 | | 3/2012 | Barrus et al. |
| 8,161,372 B2 | | 4/2012 | Ellis et al. |
| 8,166,385 B2 | | 4/2012 | Garcia-Molina et al. |
| 8,515,241 B2 | | 8/2013 | Forsyth et al. |
| 8,516,389 B2 | | 8/2013 | Fujimoto et al. |
| 8,527,866 B2 | | 9/2013 | Sutte et al. |
| 8,640,022 B2 | | 1/2014 | Waldman et al. |
| 8,645,832 B2 | | 2/2014 | Pea et al. |
| 8,786,667 B2 | | 7/2014 | Shanmukhadas |
| 8,862,646 B1 | | 10/2014 | Murayama et al. |
| 9,020,999 B2 | | 4/2015 | Rai |
| 9,042,653 B2 | | 5/2015 | Lin et al. |
| 9,066,145 B2 | | 6/2015 | Kilar et al. |
| 9,098,484 B2 | | 8/2015 | Viry |
| 9,124,856 B2 | | 9/2015 | Deshpande et al. |
| 9,129,234 B2 | | 9/2015 | Campbell et al. |
| 9,141,938 B2 | | 9/2015 | Goldberg |
| 9,256,589 B2 | | 2/2016 | Chitilian et al. |
| 9,280,533 B2 | | 3/2016 | Rochelle et al. |
| 9,430,954 B1 | | 8/2016 | Dewhurst |
| 9,830,047 B2 | | 11/2017 | Kirsch et al. |
| 10,311,141 B1 | | 6/2019 | Olkin |
| 10,535,370 B2 | | 1/2020 | Silano et al. |
| 2001/0007455 A1 | | 7/2001 | Yoo |
| 2002/0091871 A1 | * | 7/2002 | Cahill .................. G06F 17/246 719/315 |
| 2002/0099552 A1 | * | 7/2002 | Rubin .................. G09F 27/00 704/270 |
| 2004/0246376 A1 | | 12/2004 | Sekiguchi et al. |
| 2005/0097464 A1 | | 5/2005 | Graeber |
| 2005/0246642 A1 | | 11/2005 | Valderas et al. |
| 2006/0106618 A1 | | 5/2006 | Racovolis et al. |
| 2006/0179012 A1 | | 8/2006 | Jacobs |
| 2006/0212469 A1 | | 9/2006 | Babanov et al. |
| 2007/0124319 A1 | | 5/2007 | Platt |
| 2007/0136652 A1 | | 6/2007 | Ellis et al. |
| 2007/0244702 A1 | * | 10/2007 | Kahn .................. G10L 15/22 704/260 |
| 2008/0016436 A1 | | 1/2008 | Liu et al. |
| 2008/0028288 A1 | | 1/2008 | Vayssiere et al. |
| 2008/0052083 A1 | | 2/2008 | Shalev |
| 2008/0156171 A1 | | 7/2008 | Guldi |
| 2008/0215959 A1 | * | 9/2008 | Lection .................. G11B 27/34 715/201 |
| 2008/0235625 A1 | | 9/2008 | Holm et al. |
| 2008/0276159 A1 | | 11/2008 | Narayanaswami et al. |
| 2009/0006466 A1 | | 1/2009 | Ellis et al. |
| 2009/0006939 A1 | | 1/2009 | Despain et al. |
| 2009/0037309 A1 | | 2/2009 | Altberg |
| 2009/0044090 A1 | | 2/2009 | Gur et al. |
| 2009/0158139 A1 | * | 6/2009 | Morris .................. G06F 40/18 715/234 |
| 2009/0164880 A1 | * | 6/2009 | Lection .................. G06F 3/0481 715/212 |
| 2009/0254206 A1 | * | 10/2009 | Snowdon ............ G10H 1/0025 700/94 |
| 2010/0058163 A1 | | 3/2010 | Garcia-Molina et al. |
| 2010/0128855 A1 | | 5/2010 | Demo et al. |
| 2010/0131570 A1 | | 5/2010 | Weinberg |
| 2010/0205530 A1 | | 8/2010 | Butin |
| 2010/0211575 A1 | * | 8/2010 | Collins .................. G06F 16/489 707/749 |
| 2011/0035652 A1 | | 2/2011 | Mcgarry |
| 2011/0066933 A1 | | 3/2011 | Ludwig |
| 2011/0072067 A1 | | 3/2011 | Gartner |
| 2011/0252299 A1 | | 10/2011 | Lloyd et al. |
| 2012/0013539 A1 | | 1/2012 | Hogan et al. |
| 2012/0013540 A1 | | 1/2012 | Hogan |
| 2012/0066574 A1 | | 3/2012 | Lee et al. |
| 2012/0069028 A1 | | 3/2012 | Bouguerra |
| 2012/0088477 A1 | | 4/2012 | Cassidy |
| 2012/0159298 A1 | | 6/2012 | Fisher et al. |
| 2012/0189203 A1 | * | 7/2012 | Lin .................. G06F 40/18 382/181 |
| 2012/0236201 A1 | | 9/2012 | Larsen |
| 2012/0324421 A1 | | 12/2012 | Boeckenhauer et al. |
| 2013/0035075 A1 | | 2/2013 | Seetharaman et al. |
| 2013/0036346 A1 | | 2/2013 | Cicerone |
| 2013/0067305 A1 | | 3/2013 | Golan |

(56) References Cited

U.S. PATENT DOCUMENTS

| | | | |
|---|---|---|---|
| 2013/0110884 A1 | 5/2013 | Eakins | |
| 2013/0124965 A1 | 5/2013 | Elias et al. | |
| 2013/0131537 A1 | 5/2013 | Tam | |
| 2013/0298016 A1 | 11/2013 | Chigier | |
| 2014/0047312 A1 | 2/2014 | Ruble et al. | |
| 2014/0053055 A1 | 2/2014 | Summers et al. | |
| 2014/0081634 A1 | 3/2014 | Forutanpour | |
| 2014/0122516 A1 | 5/2014 | Brewer et al. | |
| 2014/0164890 A1* | 6/2014 | Fox | G06F 40/131 715/202 |
| 2014/0201126 A1 | 7/2014 | Ladeh | |
| 2014/0244668 A1 | 8/2014 | Barrus et al. | |
| 2014/0310746 A1 | 10/2014 | Larsen | |
| 2014/0359417 A1 | 12/2014 | Bar-On | |
| 2014/0372850 A1 | 12/2014 | Campbell et al. | |
| 2014/0372857 A1 | 12/2014 | Otero et al. | |
| 2014/0372858 A1 | 12/2014 | Campbell et al. | |
| 2014/0372952 A1 | 12/2014 | Otero et al. | |
| 2015/0050010 A1 | 2/2015 | Lakhani et al. | |
| 2015/0100880 A1 | 4/2015 | Matas et al. | |
| 2015/0142418 A1 | 5/2015 | Byron | |
| 2015/0161250 A1 | 6/2015 | Elbaz | |
| 2015/0378979 A1 | 12/2015 | Hirzel et al. | |
| 2016/0070733 A1 | 3/2016 | Gould | |
| 2016/0224536 A1 | 8/2016 | Thomas | |
| 2016/0240187 A1 | 8/2016 | Fleizach | |
| 2016/0336003 A1 | 11/2016 | Agiomyrgiannakis | |
| 2016/0337059 A1 | 11/2016 | Nehls | |
| 2017/0123756 A1 | 5/2017 | Canton et al. | |
| 2017/0124043 A1 | 5/2017 | Canton et al. | |
| 2017/0124044 A1 | 5/2017 | Canton et al. | |
| 2017/0124045 A1 | 5/2017 | Canton et al. | |
| 2017/0124049 A1 | 5/2017 | Campbell et al. | |
| 2017/0124050 A1 | 5/2017 | Campbell et al. | |
| 2017/0337040 A1 | 11/2017 | Salvi et al. | |
| 2020/0202069 A1 | 6/2020 | Campbell et al. | |

FOREIGN PATENT DOCUMENTS

| | | |
|---|---|---|
| KR | 20140146350 | 12/2014 |
| WO | 0157744 A2 | 8/2001 |
| WO | 2005050973 A2 | 6/2005 |

OTHER PUBLICATIONS

Han et al., "Situational data integration with data services and nested table", Service Oriented Computing and Applications, vol. 7, No. 2, Apr. 27, 2012, pp. 129-150.

U.S. Appl. No. 15/199,938, Office Action dated Dec. 6, 2017, 24 pages.

Launch Excel, Series: Resize & autofit column widths, copyright 2011, published by www.launchexcel.com, http://web.archive.org/web/20110924045718/https://www.launchexcel.com/column-width-resize, 2 pages.

U.S. Appl. No. 15/340,187, Office Action dated May 18, 2018, 32 pages.

PCT International Preliminary Report on Patentability in PCT/US2016/060025, dated May 8, 2018, 16 pages.

PCT International Preliminary Report on Patentability in PCT/US2016/060180, dated May 8, 2018, 15 pages.

U.S. Appl. No. 15/199,938, Amendment and Response filed Apr. 6, 2018, 21 pages.

PCT International Preliminary Report on Patentability in PCT/US2016/059143, dated May 8, 2018, 13 pages.

U.S. Appl. No. 15/199,938, Office Action dated May 31, 2018, 36 pages.

Levoy, Marc, "Spreadsheets for Images", In Proceedings of 21st International ACM Conference on Computer Graphics and Interactive Techniques, Jul. 24, 1994, 8 pages.

Converting test to speech in Excel, Sep. 29, 2015, 2 pages, http://web.archive.org/web/20150929113340/https://support.office.com/en-us/article/converting-text-to-speech-in-excel-3f2ca8c0-90e2-4391-8e69-573832ea7300#_toc307831251.

"PhotoSpread Quick User's Manual", WebArchive online PDF, Jul. 8, 2011, 7 pages, http://web.archive.org/web/20110708161116/http://infolab.stanford.edu/~paepcke/shared-documents/photospread/photospreadmanual010309.pdf.

An Introduction to Data Validation in Excel, Published on: Mar. 15, 2014, http://trumpexcel.com/2014/03/learn-all-about-data-validation-in-excel/, 4 pages.

Azzarello, Pat, "Group Report: Improving Computer Audio and Music Production Systems User Interfaces", In Proceedings of Tenth Annual Interactive Music Conference, Oct. 13, 2005, 12 pages.

Canton et al., "Compound Data Types", Oct. 2, 2015, 16 pages.

Canton et al., "Condensed Core Design", Jul. 30, 2015, 312 pages.

Canton et al., "Rich Data Types", Jul. 30, 2015, 217 pages.

Chang, et al., "A Spreadsheet Model for Handling Streaming Data", In Proceedings of the 33rd Annual ACM Conference on Human Factors in Computing Systems, Apr. 18, 2015, 4 pages.

Chang, et al., "A spreadsheet model for using web service data", In Proceedings of IEEE Symposium on Visual Languages and Human-Centric Computing, Jul. 28, 2014, 8 pages.

Chang, et al., "Creating interactive web data applications with spreadsheets", In Proceedings of the 27th annual ACM symposium on User interface software and technology, Oct. 5, 2014, pp. 87-96.

Create an Excel Drop Down list with Search Suggestions, Published on: Oct. 19, 2013, http://trumpexcel.com/2013/10/excel-drop-down-list-with-search-suggestions/, 11 pages.

Dalgleish, Debra, "Excel List of All MP3 Files in a Directory", Published on: May 5, 2009, http://blog.contextures.com/archives/2009/05/05/excel-list-of-all-mp3-files-in-a-directory/, 3 pages.

Embedded Metadata in WAVE Files, Retrieved on: Apr. 25, 2016, http://www.avpreserve.com/wp-content/uploads/2014/04/EmbeddedMetadata.pdf, 10 pages.

French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.

How to: Use Text-to-Speech in Excel 2002, Retrieved on: Jul. 7, 2016, https://support.microsoft.com/en-us/kb/288986, 4 pages.

Hoydahl, Jan, "Cominvent AS—Enterprise Search Consultants", Published on: Jan. 25, 2012, http://www.cominvent.com/2012/01/25/super-flexible-autocomplete-with-solr/, 4 pages.

In-Cell Dropdown and Validation in Spreadsheets, Published on: Aug. 26, 2010, http://googledrive.blogspot.in/2010/08/in-cell-dropdown-and-validation-in.html, 27 pages.

Inglis, "DoReMIRE ScoreCloud", SOS Sound on Sound, Jan. 1, 2015, http://www.soundonsound.com/reviews/doremir-scorecloud, 4 pages.

Kandel et al., "PhotoSpread: A Spreadsheet for Managing Photos", The 26th Annual Chi Conference on Human Factors in Computing Systems, Conference Proceedings, Apr. 5, 2005, in Florence, Italy, 10 pages.

Kandel et al., "The PhotoSpread Query Language", Sep. 6, 2007, http://ilpubs.stanford.edu:8090/812/1/2007-27.pdf, abstract only ,1 page.

Lim, Jon, "Google Spreadsheets: Count with Multiple Values in Cells", Published on: Apr. 7, 2014, http://jonlim.ca/2014/04/google-spreadsheets-count-multiple-values-cells/, 5 pages.

PCT International Search Report in PCT/US2016/059135, dated Feb. 16, 2017, 15 pages.

PCT International Search Report in PCT/US2016/059143, dated Apr. 3, 2017, 21 pages.

PCT International Search Report in PCT/US2016/059303, dated Feb. 16, 2017, 17 pages.

PCT International Search Report in PCT/US2016/060025, dated Apr. 7, 2017, 23 pages.

PCT International Search Report in PCT/US2016/060194, dated Feb. 16, 2017, 14 pages.

PCT Invitation to Pay Additional Fees in PCT/US2016/059143, dated Feb. 9, 2017, 9 pages.

Powerful transcription that's ready for work, Published on: Dec. 17, 2015, http://australia.nuance.com/dragon/transcription-solutions/index.htm, 5 pages.

(56) References Cited

OTHER PUBLICATIONS

Rivendell—Scenario: breakaway from normal progaming to playout audiobook chapters, for a length of time and rejoing normal programming. And how to load and playout the audiobook discs/ tracks in order, published on: Apr. 3, 2016, https://thebrettblog.wordpress.com/, 31 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Trying to open audio files from spreadsheet using windows API, Retrieved on: Apr. 25, 2016, http://stackoverflow.com/questions/34459965/trying-to-open-audio-files-from-spreadsheet-using-windows-api, 3 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Virostek, Paul, "The Power User's Guide to Soundminer Metadata", Published on: Jun. 24, 2014, http://www.creativefieldrecording.com/2014/06/24/the-power-users-guide-to-soundminer-metadata/, 12 pages.
Wang et al., "Development of an image processing based sheet music recognition system for iOS device", 2014 IEEE International Conference on Consumer Electronics, May 26, 2014, 2 pages.
Wyatt, Allen, "Conditionally Playing an Audio File", Published on: Oct. 10, 2011 http://excel.tips.net/T006559_Conditionally_Playing_an_Audio_File.html, 2 pages.
Wyatt, Allen, "Generating Automatic Links to Audio Files (Microsoft Excel)" Jun. 7, 2014, http://excelribbon.tips.net/T013127_Generating_Automtic_Links_to_audio_files.html, 4 pages.
Wyatt, Allen, "Inserting a Sound File in Your Worksheet", Published on: Apr. 10, 2011, http://excel.tips.net/T002864_Inserting_a_Sound_File_in_Your_Worksheet.html, 2 pages.
Wyatt, Allen, "Inserting a Voice Annotation in Your Worksheet", Published on: Oct. 19, 2011, http://excel.tips.net/T002870_Inserting_a_Voice_Annotationin_Your_Worksheet.html, 2 pages.
PCT Second Written Opinion in PCT/US2016/059135, dated Nov. 7, 2017, 6 pages.
U.S. Appl. No. 15/199,968, Amendment and Response filed Oct. 12, 2017, 9 pages.
PCT Second Written Opinion in PCT/US2016/059303, dated Oct. 26, 2017, 8 pages.
U.S. Appl. No. 15/199,968, Notice of Allowance dated Nov. 13, 2017, 10 pages.
PCT Second Written Opinion in PCT/US2016/060194, dated Oct. 26, 2017, 7 pages.
Bakke et al., "A spreadsheet-based user interface for managing plural relationships in structured data", Human Factors in Computing Systems, May 7, 2011, 10 pages.
PCT Invitation to Pay Additional Fees in PCT/US2016/060180, dated Feb. 9, 2017, 8 pages.
U.S. Appl. No. 15/199,968, Office Action dated Jul. 12, 2017, 20 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.
U.S. Appl. No. 15/339,170, Office Action dated Jun. 28, 2018, 23 pages.
PCT International Preliminary Report on Patentability in PCT/US2016/059303, dated Jan. 18, 2018, 9 pages.
PCT International Preliminary Report on Patentability in PCT/US2016/060194, dated Jan. 18, 2018, 8 pages.
PCT International Preliminary Report on Patentability in PCT/US2016/059135, dated Jan. 30, 2018, 16 pages.
"Non Final Office Action Issued in U.S. Appl. No. 15/199,938", dated Oct. 5, 2018, 34 pages.
School of Data, "Sort and Filter: The basics of spreadsheets," copyright 2012, schoolofdata.org, https://web.archive.org/web/20121217023142/https://schoolofdata.org/handbook/courses/sort-and-filter, pp. 1-7, 2012.
Non Final Office Action Issued in U.S. Appl. No. 15/199,953, dated Sep. 17, 2018, 33 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Final Office Action Issued in U.S. Appl. No. 15/339,170", dated Jan. 11, 2019, 21 Pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"Final Office Action Issued in U.S. Appl. No. 15/199,938", dated Feb. 26, 2019, 37 Pages.
"Final Office Action Issued in U.S. Appl. No. 15/199,953", dated Apr. 18, 2019, 40 Pages.
"5 Ways to Extract Video Frames and Save to Images", Retrieved From: https://www.raymond.cc/blog/extract-video-frames-to-images-using-vlc-media-player/, Apr. 7, 2016, 12 Pages.
"Anchor Image to a Cell", Retrieved From: http://apache-poi.1045710.n5.nabble.com/Anchor-image-to-a-cell-td4302682.html, Apr. 14, 2011, 9 Pages.
"Combine the Contents of Multiple Cells", Retrieved from: https://support.office.com/en-us/article/Combine-the-contents-of-multiple-cells-3A86C317-6B91-4F1D-8781-203320AEFDCE, Retrieved on: Jan. 25, 2016, 3 Pages.
"Deliver Content Using Spreadsheet Templates", Retrieved from: https://support.google.com/youtube/answer/6066171?hl=en, Sep. 21, 2015, 4 Pages.
"How to Concatenate Cells in Excel", Retrieved From: https://wagda.lib.washington.edu/gishelp/tutorial/concatenate.pdf, Jul. 9, 2007, 6 Pages.
"How to Insert Multiple Pictures and Resize Them at Once in Excel?", Retrieved From: https://www.extendoffice.com/documents/excel/1156-excel-insert-multiple-pictures.html, Oct. 9, 2014, 18 Pages.
"How to Insert Picture into Excel Cell", Retrieved from: https://web.archive.org/web/20151018172741/http://trumpexcel.com/2013/05/insert-picture-into-excel-cell/, May 30, 2013, 9 Pages.
"How to Resize Pictures to Fit Cells in Excel?", Retrieved From: http://www.extendoffice.com/documents/excel/1060-excel-resize-picture-to-fit-cell.html, Retrieved on: Jan. 22, 2016, 11 Pages.
"Insert Images Into Google Spreadsheet Cells", Retrieved From: https://www.bettercloud.com/monitor/the-academy/insert-images-into-google-spreadsheet-cells/, Apr. 15, 2016, 5 Pages.
Vaziri, et al., "Stream Processing with a Spreadsheet", In Proceedings of European Conference on Object-Oriented Programming, Jul. 28, 2014, pp. 360-384.
Wyatt, Allen, "Displaying Images Based on a Result", Retrieved From: https://web.archive.org/web/20160719101952/https://excel.tips.net/T003128_Displaying_Images_based_on_a_Result.html, Jun. 3, 2014, 10 Pages.
"Advisory Action Issued in U.S. Appl. No. 15/339,170", dated Jul. 5, 2019, 5 Pages.
"Non Final Office Action Issued in U.S. Appl. No. 15/339,170", dated Oct. 4, 2019, 25 Pages.
"Notice of Allowance Issued in U.S. Appl. No. 15/340,187", dated Sep. 18, 2019, 9 Pages.
Wyatt, Allen, "Hiding Graphics When Filtering", Retrieved From: https://excel.tips.net/T003866_Hiding_Graphics_when_Filtering.html, Dec. 8, 2015, 2 Pages.
Chang, et al., "A Spreadsheet Tool for Creating Web Applications Using Online Data", In Proceedings of CHI Workshop on End User Development in the Internet of Things Era, vol. 12, Issue 2, Apr. 18, 2015, pp. 39-44.
Eastonz, Trevor, "Embed a Video in Microsoft Excel—It's a breeze", https://www.onlinepclearning.com/embed-a-video-in-microsoft-excel/, Jul. 18, 2013, 7 Pages.

(56) References Cited

OTHER PUBLICATIONS

French, Ted, "Concatenate Text Data in Google Spreadsheets", Retrieved from: https://web.archive.org/web/20140619031649/http://spreadsheets.about.com/od/exceltexffunctions/ss/2014-06-15-google-spreadsheets-concatenate-text-stirings.htm, Jun. 19, 2014, 2 Pages.

Hacid, et al., "A Database Approach for Modeling and Querying Video Data", Published in IEEE Transactions on Knowledge and Data Engineering, vol. 12, Issue 5, Sep. 2000, pp. 729-750.

Harvey, Greg, "How to Edit and Format Inserted Pictures in Excel 2013", Retrieved From: https://www.dummies.com/software/microsoft-office/excel/how-to-edit-and-format-inserted-pictures-in-excel-2013/, Jan. 2013, 4 Pages.

Keng, Kuek Ser Kuang, "Edit Video Using Spreadsheet—GS Video", Retrieved From: https://www.youtube.com/watch?v=-bwFdhJg1MA, Dec. 24, 2015, 3 Pages.

Klement, Scott, "Load Images into Your HSSF Spreadsheets", Retrieved From: http://www.easy400.net/hssfcgi/documentation/20081211.html, Dec. 11, 2008, 5 Pages.

Machlis, Sharon, "How to Create an Automatically Updating Google Spreadsheet", Retrieved From: https://www.computeworld.com/article/2469616/business-intelligence/business-intelligence-79661-how-to-create-an-automatically-updating-spreadsheet.html, Apr. 21, 2017, 9 Pages.

Puls, Ken, "Using VLOOKUP to Return a Picture", Retrieved From: https://web.archive.org/web/20140207193135/http://www.cga-pdnet.org/pdf/vlookupforpictures.pdf, Feb. 7, 2014, pp. 1-7.

Reynolds, Janine, "New in Smartsheet: See Images in Your Sheets", Retrieved From: https://web.archive.org/web/20160321054944/https://www.smartsheet.com/blog/new-in-smartsheet-embed-images, Jan. 15, 2016, pp. 1-12.

Wyatt, Allen, "Sorting with Graphics", Retrieved From: https://web.archive.org/web/20161201040607/http://excel.tips.net/T002954_Sorting_with_Graphics.html, Jan. 30, 2016, 2 Pages.

"Non Final Office Action Issued in U.S. Appl. No. 15/199,938", dated Jun. 27, 2019, 24 Pages.

"Final Office Action Issued in U.S. Appl. No. 15/340,201", dated Jul. 11, 2019, 15 Pages.

"Non Final Office Action Issued in U.S. Appl. No. 15/199,953", dated Dec. 3, 2019, 23 Pages.

"Notice of Allowance Issued in U.S. Appl. No. 15/199,953", dated Jul. 6, 2020, 11 Pages.

"Final Office Action Issued in U.S. Appl. No. 15/199,953", dated Apr. 30, 2020, 18 Pages.

"Non Final Office Action Issued in U.S. Appl. No. 15/340,201", dated Apr. 24, 2020, 16 Pages.

Final Office Action Issued in U.S. Appl. No. 15/340,201, dated Sep. 22, 2020, 16 Pages.

"Non Final Office Action Issued in U.S. Appl. No. 16/806,977", dated Jan. 28, 2021, 23 Pages.

"Non Final Office Action Issued in U.S. Appl. No. 15/340,201", dated Mar. 17, 2021, 19 Pages.

\* cited by examiner

CALCULATIONS ON SOUND ASSOCIATED WITH CELLS IN SPREADSHEETS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,292, entitled "Compound Data Objects," filed on Jun. 30, 2016; U.S. Provisional Application No. 62/357,284, entitled "Rich Data Types," filed on Jun. 30, 2016; the entire disclosures of which are hereby incorporated in their entireties herein by reference.

BACKGROUND

Today, there is no notion of embedding sound into spreadsheets without custom code. More importantly, even if sound is embedded using custom code, the properties of the sound file cannot be accessed and operated on by the spreadsheet application. Accordingly, spreadsheets cannot analyze sound files, play sound files in response to business logic, or otherwise integrate sound processing or sound recognition into the spreadsheet logic. Additionally, current spreadsheets are ill-suited for providing new features in a touch- or mobile-first world where sound recordings are immediately and universally available. Nor are current spreadsheets well-suited for low-vision readers, who use sound to make sense of data in a spreadsheet.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for using calculation functions associated with a spreadsheet to alter, change and/or edit one or more audio files that are associated with one or more cells of a spreadsheet application. In aspects, when an audio file is associated with one or more cells, the audio file may be treated as a new type of value in the one or more cells. In further aspects, both an audio file and additional data may be associated with a single cell of the spreadsheet. In some cases, a user may make an audio recording, e.g., on a mobile device, and associate the audio recording with a spreadsheet provided by a mobile spreadsheet application. Alternatively, the spreadsheet application may have the capability to generate sound from data using various algorithms to create an audio file. For instance, the spreadsheet application may perform transcription on documents (text-to-speech), convert a chart or a range of values into sound and/or use optical character recognition (OCR) on sheet music generate music. The spreadsheet application may then associate the audio file with a spreadsheet. In aspects, an associated audio file may be anchored to a cell or a range of cells within the spreadsheet or may be allowed to float over the grid.

Upon associating an audio file with a spreadsheet, various audio parameters (e.g., pitch, length, speed, volume, etc.) may be retrieved by a function associated with the spreadsheet. A "calc engine" (e.g., a calculation engine for the spreadsheet application) may then perform one or more calculation functions on the parameters to alter one or more playback properties of the audio file. In addition, the calculation functions may alter the content of the audio file. In some instances, a new audio file is generated and provided on the spreadsheet application. In other instances, the original audio file is altered.

In some instances, the calculation functions may be used to automatically play, update, and or/change the content of the audio file when certain conditions in spreadsheet data are met. In further aspects, transcription (e.g., speech-to-text) of an audio file may be performed and the text transcription may be inserted into a comment bubble, into the same cell as the audio file, or into different cell or cells of the spreadsheet. However, if a calculation function alters the base audio file, a calculation function may automatically be invoked to update the transcription so that it accurately reflects the updated audio file.

In aspects, a system is provided having at least one processing unit and at least one memory storing computer executable instructions which, when executed by the at least one processing unit, cause the system to perform a method. The method includes receiving an audio file and obtaining information about the audio file using a function associated a spreadsheet application. Once the information is received, a calculation function associated with the spreadsheet may be used to change at least a portion of the audio file. The updated audio file is then provided to the spreadsheet and a user may access the at least the portion of the audio file that was changed.

In further aspects, a method for altering an audio file in a spreadsheet application is disclosed. According to this method, an audio file is received and associated with at least one cell of a spreadsheet. Information about the audio file is obtained. The obtained information is then provided to a calculation function associated with the spreadsheet application. The calculation function may be used to change at least one playback property of the audio file.

In still further aspects, a computer-readable storage medium storing computer executable instructions which, when executed by at least one processing unit, cause a computing device to receive an audio file and receive additional data. The audio file and the additional data are associated with at least one cell of a spreadsheet. Information about the audio file and the additional data is then obtained and a calculation is performed on the audio file. In response to the calculation, an updated audio filed is generated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
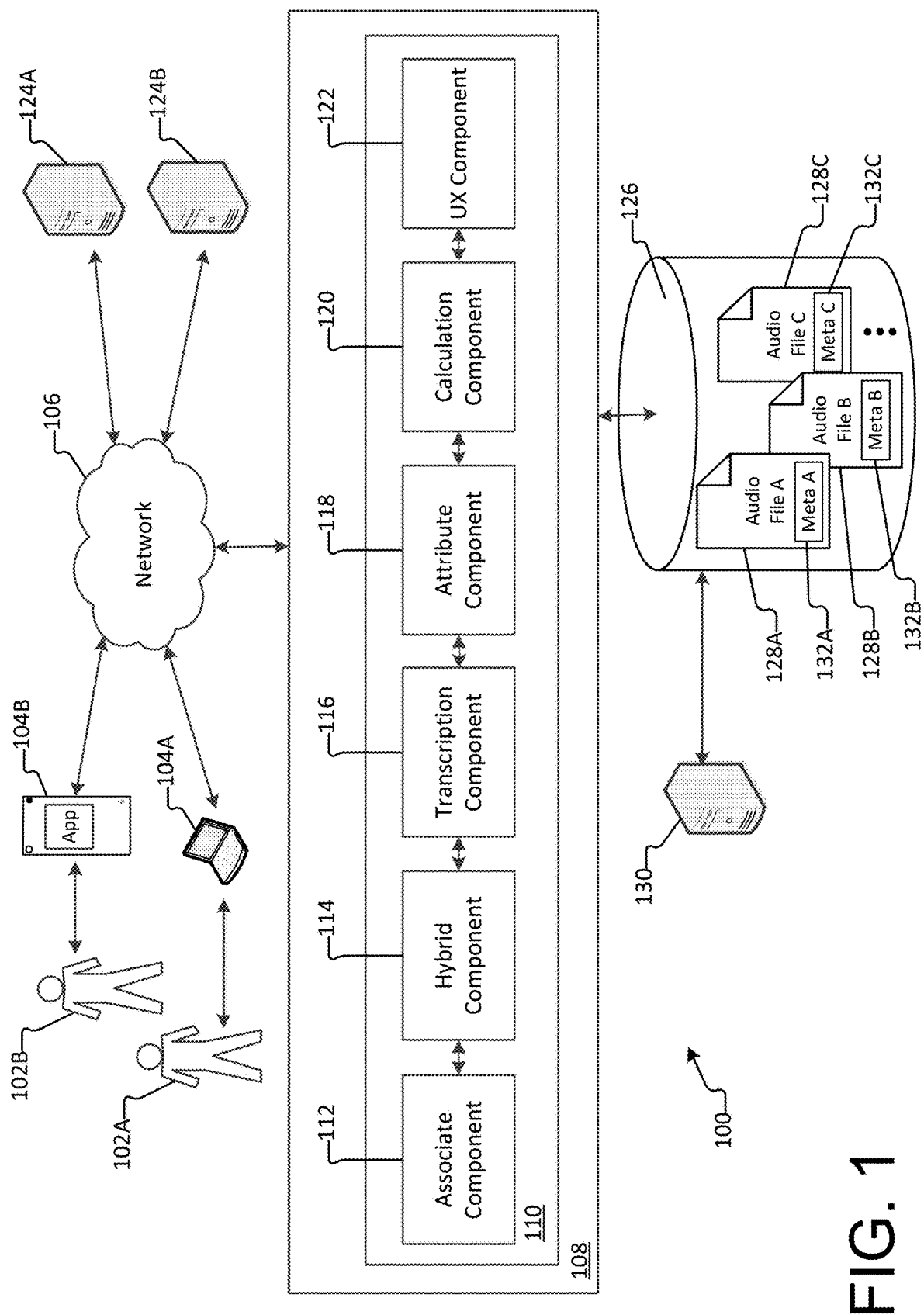
FIG. 1 illustrates a system for associating one or more audio files with one or more cells in a spreadsheet and performing a calculation function on the audio file, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for associating one or more audio files with a spreadsheet and performing a calculation function on one or more parameters of the audio file. In some aspects, the content of the audio file may be changed. In other aspects, one or more playback properties of the audio file are changed.

In further aspects, both an audio file and additional data may be associated with a cell of the spreadsheet. In these instances, the calculation function may change one or both of the audio file and the additional data.

The audio file may be an audio recording made or otherwise generated by a user (e.g., on a mobile device). The audio file may then be associated with one or more cells of a spreadsheet provided by a mobile spreadsheet application. The spreadsheet application may also have the capability to perform transcription on documents (text-to-speech) and/or optical character recognition (OCR) on sheet music, convert the document or sheet music into an audio file, and associate the audio file with a spreadsheet.

In cases where transcriptions are included, the calculation functions described herein may also be used to update the transcriptions to mirror the content of the updated audio file and vice versa. For example, if a source document that was used for a text-to-speech transcription was altered by a function in the spreadsheet, the calculation function may be used to generate an updated audio file.

In aspects, an associated audio file may be anchored to a cell or a range of cells within the spreadsheet or may be allowed to float over the grid. However, even if the audio file is allowed to float, the audio file may be referenced by a function in the spreadsheet and/or a calculation function in which various operations are performed on the audio file to change or update the audio file.

For example, upon associating an audio file with a spreadsheet, various audio parameters (e.g., pitch, length, speed, volume, etc.) may be retrieved for manipulation by a calculation function. In other aspects, the content of the audio file may be changed. For example, one or more clips may be generated from a single audio file, two or more audio files may be combined, different starting and ending points for playback may be specified and so on.

The various functions described herein may also be used to automatically initiate playback of the audio file when certain conditions in the spreadsheet data are met (e.g., revenue numbers hit certain values). Further, the audio file may be automatically updated (e.g., using one or more calculation functions) when certain conditions in the spreadsheet data are met.

FIG. 1 illustrates a system for associating one or more audio files with one or more cells in a spreadsheet and for performing one or more calculation functions on the audio files, according to an example embodiment.

System 100 may include one or more client computing devices 104 (e.g., client computing devices 104A and 104B) that may execute a client version of a spreadsheet application capable of associating audio files with cells in a spreadsheet and performing calculation functions on those audio files. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices (e.g., server computing device 108). In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of associating one or more audio files with cells of a spreadsheet. While a server version of the spreadsheet application 110 and associated components 112-122 are shown and described, this should not be understood as limiting. Rather, a client version of spreadsheet application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including audio data and audio attributes, associated with cells of a spreadsheet to and from the one or more client computing devices 104 and/or one or more other server computing devices (e.g., server computing devices 124A and/or 124B) via network 106.

As used herein, sound waves may be digitally encoded (e.g., by pulse-code modulation), in some cases processed (e.g., filtered, edited, etc.) and/or compressed (e.g., based on a codec to reduce file size), and stored as an audio file in a file format identified by a file extension, such as .wav, .wma, .aiff, .m4a, .snd, .mp3, .omf, etc. For example, a microphone of a mobile device may record (or capture) sound waves (e.g., of a conversation) and may convert the sound waves into an analog electric signal. An analog-to-digital converter (ADC) may then convert the analog signal into a digital signal, e.g., generally using pulse-code modulation. In some cases, the ADC may be available on the mobile device, while in other cases the analog signal may be downloaded from the mobile device and converted to a digital signal on another device (e.g., personal or server computing device). The digital signal may be processed and/or compressed and stored in a file format (e.g., audio data), as detailed above. Later, when an audio file is played, the digital signal may be converted back to an analog electrical signal using a digital-to-audio converter (DAC) for transmission to a speaker.

In aspects, an audio file may be retrieved based on a file locator, which may be a uniform resource locator (URL) identifying a file path to a local storage location or a remote storage location. In aspects, one or more audio files (e.g., audio files 128A, 128B, and 128C) may be stored in a storage location (e.g., storage 126) accessible to spreadsheet application 110.

An audio file may be defined by audio data (e.g., digital data encoding the sound) and audio attributes that may describe the audio data (e.g., frequency, amplitude, sampling rate, codec, etc.), audio specifications (e.g., bitrate, volume, pitch, speed, channel, audio effects, etc.) and/or the audio file (e.g., author, creation date and/or time, file name, file size, duration, etc.). As should be appreciated, each audio attribute may be defined by an attribute-value pair. That is, an audio attribute (e.g., duration) may be paired with a value for that attribute (e.g., 1:05 minutes) for a particular audio file. The audio data, audio attributes, audio specifications and/or the audio file itself may all be used as parameters in the various calculation functions supported by the spreadsheet application. As the calculation function updates or otherwise changes one or more of these values, the audio file, or one or more playback properties of the audio file, may be changed.

In at least some examples, audio attributes may be organized in a data structure (e.g., a table, array, etc.) based on attribute-value pairs and/or attribute-type pairs. For example, for attribute "bitrate" a value may be "96 kilobits per second (Kbps)" and a type may be "variable bitrate, VBR"; for attribute "sampling rate" a value may be "44.1 kHz"; for attribute "channel" a type may be "stereo" and a value may be "channel 1"; for attribute "duration" a value may be "21:04 minutes"; for attribute "codec" a type may be "MP3"; and the like.

As should be appreciated, the above attribute-value and/or attribute-type pairs are offered as examples only and any suitable value or type may be paired with any attribute identified above. Attribute-value pairs and/or attribute-type pairs associated with audio attributes may be organized and stored in any suitable data structure, e.g., a table, array, etc., and may be appended as metadata to an audio file comprising audio data (e.g., digitally encoded audio signals). For instance, as illustrated, metadata 132A may be appended to audio file 128A, metadata 132B may be appended to audio file 128B, and metadata 132C may be appended to audio file 128C. Alternatively, the audio attributes may be stored in a separate location or database from the audio files and may be referenced by or otherwise indexed to the audio files (not shown).

As may be appreciated, audio data may include digitally encoded (or modulated) signals representative of sound waves, where the audio data is in a machine-readable format for storing and/or playing the audio file. In some aspects, the audio data may be described in terms of sound wave attributes (e.g., frequency, amplitude, etc.), the sample rate at which the audio data was captured and/or the codec (compressor/decompressor) used to compress the audio data. Additionally, audio attributes may describe specifications or settings associated with the audio data (e.g., bitrate, volume, pitch, speed, channel, audio effects, etc.) and/or attributes of the audio file (e.g., author, creation date and/or time, file name, file size, duration, etc.). In aspects, audio attributes describe the audio data and/or audio file in a human-readable format.

In at least some examples, one or more audio files may be stored in different storage locations within a distributed environment (e.g., cloud computing environment) accessible to spreadsheet application 110 over a network, e.g., network 106. As described herein, the location of an audio file in storage may be represented by a file locator, which may be a URL to local storage (e.g., C:\Music\favorites\song1.wav) or a URL to remote storage accessible over a network (e.g., http://www.music.com/90smix/song1.wav). Additionally, an audio file may be referenced by name (e.g., "song1.wav") to locate it within the local workbook file. With respect to remote storage, a URL may provide a file path to a storage location hosted by a third party (e.g., Pandora®, Spotify®, etc.), in a public or private cloud storage location (e.g., OneDrive®, iCloud®, iTunes®, Amazon® Cloud Drive, etc.), in an enterprise storage location (e.g., SharePoint®, etc.), in a public storage location accessed over the Internet, and the like. In other aspects, the audio file may be referenced within a function of the spreadsheet by a globally unique name rather than by a URL. A globally unique name may be any string that is unique across the spreadsheet, e.g., "OctoberEarnings" or "OctoberEarnings.wav." If the same name is used on different sheets of a spreadsheet to return different values, the name may be qualified by the sheet on which it appears in order to create a unique name, e.g., "Sheet1!OctoberEarnings" and "Sheet2!OctoberEarnings."

As illustrated in FIG. 1, the spreadsheet application 110 may include various components for associating one or more audio files with one or more cells of a spreadsheet and for preforming calculation functions on the audio files. These components include an associate component 112, a hybrid component 114, a transcription component 116, an attribute component 118, a calculation component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 102A or 102B).

As described above, the spreadsheet application 110 may be configured to associate one or more audio files with one or more cells of a spreadsheet and to perform one or more calculation functions on the audio files. As should be appreciated, while examples and descriptions provided below may generally reference associating a single audio file with a single cell and performing a calculation, the methods and systems described may similarly be applied for multiple audio files within a single cell or within a range of cells. In cases where application of the methods or systems may differ with respect to associating multiple audio files with a single cell, additional disclosure will be provided.

In aspects, associate component 112 may associate one or more audio files with one or more cells of a spreadsheet. In some examples, associate component 112 may associate an audio file with a cell by anchoring the audio file as a value within the cell. For example, the audio file may be anchored within a cell based on a function in the formula bar of the cell that identifies the file locator (e.g., a globally unique name or URL) for the audio file (e.g., =GETAUDIO("http://www.music.com/90smix/song1.wav")). Alternatively, an audio file may be associated with a cell without using a globally unique name or URL by selecting an "Insert" operation in the toolbar and using a dialog filtered to sound types to find and insert the audio file. In that case, the formula for the cell may specify the audio file as: "=GETAUDIO(song1.wav)". Alternatively, the audio file may be identified without a formula, for instance, the name of the audio file may simply be listed without the "=GETAUDIO" operator, e.g., "song1.wav" or "<Audio> song1.wav".

Additionally, associate component 112 may associate a plurality of audio files with one or more cells of a spreadsheet. For instance, associate component 112 may associate a plurality of audio files with a cell by anchoring the plurality of audio files to the cell based on a function identifying the file locators (e.g., globally unique names or URLs) for each of the plurality of audio files. In other aspects, associate component 112 may associate a plurality of audio files with a cell based on a function identifying a folder in which the plurality of audio files is located.

In some aspects, associate component 112 may associate the plurality of audio files with one another (e.g., in an array) in addition to associating the plurality of audio files with a cell and/or a spreadsheet. In other cases, the plurality of audio files may be associated in an array by a service. For instance, a single audio file (e.g., of a conversation between multiple individuals) may be sent to a service and an array of audio files may be returned (e.g., including an audio file for each individual's voice identified and extracted from the audio file). In other examples, a single audio file may be divided into multiple tracks (e.g., each track representing a particular loop or wave or sound from the original audio file) and associated in an array. As should be appreciated, other examples are possible and may be incorporated according to the methods and systems described herein.

In some cases, in order to indicate that an audio file is associated with a cell, a visual representation (e.g., speaker icon, play icon, waveform rendering, sliced waveform rendering, track name with metadata, special icon with metadata, etc.) may be provided for the audio file. For example, the visual representation may depict the actual waveform and may be interactive. That is, a user may scroll along the visual representation and begin listening to the audio file from any position along the waveform. Alternatively, the visual representation may not depict the actual waveform but may be a standard representation of a waveform and may be overlaid with a play icon. In this case, upon selection of the play icon, the audio file may be played from the beginning of the audio file. In aspects, the visual representation may be fit to a cell size, i.e., bounded by the cell border.

In other cases, associate component 112 may anchor a portion of the visual representation (e.g., a top left corner of the visual representation) to a portion of a cell (e.g., top left corner of the cell). In this case, the visual representation may not be fit to the cell size, but may be displayed smaller than the cell (e.g., inside the cell border with at least some white space) or displayed larger than the cell (e.g., extending beyond the cell border onto other cells). In still other cases, the visual representation may be provided as background for a cell and other data may be displayed over the visual representation (e.g., a title, topic, etc., of the audio file). Whether a visual representation is fit to a cell or not, the audio file that is anchored to a cell may move with the cell when the cell is relocated within the spreadsheet (e.g., in response to a sort or filter operation). In this way, a visual representation of an anchored audio file may behave in substantially the same or similar way as alphanumeric data (e.g., textual data, numeric data, formulas, and the like) and, thus, may behave predictably within the spreadsheet in response to operations performed on the spreadsheet.

In other examples, the associate component 112 may associate an audio file with the spreadsheet but may allow a visual representation of the audio file to float over the grid. When a visual representation of an audio file is allowed to float over the grid (e.g., over one or more cells of the spreadsheet), the visual representation may be displayed within the spreadsheet and the audio file may be played from within the spreadsheet (e.g., by activating a play control associated with the visual representation, or by launching a user interface by right-clicking or hovering over the visual representation, and the like).

However, in this case, based on a user preference, the visual representation may or may not move with cells as they are relocated within the spreadsheet (e.g., in response to sort or filter operations). In some examples, although the visual representation of the audio file may be allowed to float, the audio file may be referenced (e.g., by globally unique name) in one or more functions or calculation functions within the spreadsheet such that one or more operations may be performed on the audio file and/or one or more operations may be performed on the spreadsheet based on attributes of the audio file. In this case, when cells are relocated the visual representation of the audio file may or may not move with the cells, but calculation functions may be performed on the audio file and/or the spreadsheet based on the calculation functions, or other functions associated with the spreadsheet application referencing the audio file.

Similarly, whether or not a visual representation of an audio file is anchored, floating or even displayed within the spreadsheet, the audio file may be referenced (e.g., by globally unique name) in one or more functions or calculation functions such that one or more operations and calculations may be performed on the audio file.

For instance, the audio file may be played when a condition of a function referencing the audio file is satisfied (e.g., play referenced audio file when revenue number hits "X" or play referenced audio file as explanation for cost forecast "Y," etc.). Further, one or more playback properties associated with the audio file may be changed or updated based on a particular calculation or function. For instance, a playback speed, a playback volume, and/or a playback pitch of the audio file may be adjusted by a calculation function associated with the spreadsheet. Further, one or more playback properties may be adjusted when a condition of a function referencing the audio file is satisfied. For example, an audio file may be played at a higher volume or at a faster speed when revenue number hits "X." In addition, content of the audio file may be updated or changed based on one or more conditions of a function referencing the audio file being satisfied.

In some aspects, a calculation function may "change a state" of an audio file with respect to a cell. For instance, a particular calculation or function may convert a visual representation of an audio file from floating to anchored within a cell. A calculation function may also convert a visual representation from anchored in a cell to floating (e.g., by "popping" the audio file out of a cell). In this case, the audio file may no longer be represented in the formula bar of the cell and may be displayed as dissociated from the cell (e.g., in another location within the spreadsheet). As should be appreciated, UI controls (e.g., provided in an audio toolbar, provided upon right click of a mouse, etc.) may also allow the state of an audio file to be changed.

In an example, a mobile version of associate component 112 may associate one or more audio recordings from a mobile device in a spreadsheet application. For instance, consider a lawyer preparing for a deposition. The lawyer may wish to dictate questions on his or her mobile device and may further wish to associate the questions with a spreadsheet in preparation for the deposition. For instance, the lawyer may open a mobile version of the spreadsheet application, may select a first cell in a first row of the spreadsheet, may dictate the first question (which may be encoded and stored as an audio file by the mobile device), and my insert the audio file in the selected cell. In some aspects, the mobile version of the spreadsheet application may automatically associate the audio file with the selected cell.

The lawyer may then dictate a second question and insert it in a second cell in a second row of the spreadsheet, and so on. Thereafter, the spreadsheet application may transcribe each of the audio files and provide a text transcription of each audio file, with the text transcription in the same cell as the audio file or in a different cell. For instance, the spreadsheet application may automatically insert a new cell adjacent to the cell associated with the audio file and may insert the text transcription in the new cell. In this way, the lawyer may create a spreadsheet of questions by dictation that may be transcribed for later use in the deposition. As the dictations are associated with a spreadsheet, spreadsheet operations may be performed on the dictations, e.g., the lawyer may filter for dictations recorded on or after a certain date, for dictations including certain keywords, for dictations including certain speakers, etc.

As will be described below, a calculation function, provided by a calculation component 120, may be used to truncate part of the dictation. As a result, the text transcription will also be altered or updated to reflect the new audio file.

Hybrid component 114 may associate different types of data with a single cell. In some cases, hybrid component 114 may provide a visual representation of the audio file as background for the cell and may display the additional data over the visual representation. Alternatively, a visual representation of the audio file may be displayed in one portion of the cell and the additional data may be displayed in another portion of the cell (e.g., above, below, to either side, or wrapping the visual representation). As detailed above, an audio file may comprise audio data, which may be digitally encoded (or modulated) signals representative of sound waves in a machine-readable format for storing and/or playing the audio file. Additional data may include any type of data other than the audio file, e.g., textual data, numerical data, charts, images, etc. For example, additional data may include a text transcription of the audio file or may include information about the audio file (e.g., song name, song artist, recording date, duration, etc.).

In some cases, hybrid component 114 may associate the audio file with the additional data in a structured format, e.g., an array, record, or table, which is referred to herein as a "compound data type." In aspects, when a visual representation of the audio file is provided as background (or fill) for a cell, use of a compound data type may not be necessary to associate different types of data with the cell; however, when the visual representation of the audio file and the additional data are displayed in different areas of the same cell, use of a compound data type may provide advantages. For example, when the audio file and the additional data are associated with a cell using a compound data type, layout properties for the visual representation of the audio file and the additional data may also be organized in the structured format. In some cases, compound data types may even be nested within each other.

The structure of a compound data type may be leveraged in complex calculations, thereby providing a model for referencing and using different aspects of the data. For example, each component of a compound data type may be represented by a formula or a function. Accordingly, one or more calculations may be performed on the data associated with each component. For example, individual representation of components facilitates the creation of structures in a single cell where calculations can reference back to other components of the compound data type. For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.bitrate"), or a unique name may be used to get the value (e.g., if cell A1 has a unique name, "OctoberEarningsRecording.bitrate"). In this way, each field is available to the calc engine and/or formulas within a spreadsheet. The data in these fields may be changed or updated based on calculation performed on the data (or on calculations performed on data in other cells that are associated with the compound data type).

A compound data type may be an object structured to include or reference the audio file (e.g., audio data and audio attributes) and additional data (e.g., text transcription data, video data, charts, and the like). In some aspects, additional data may be described in terms of attribute-value pairs. In this case, the natural attribute-value descriptors may be leveraged for organizing the additional data within the structured format of a compound data type. In other examples, the additional data may not necessarily be represented by attribute-value pairs. For instance, the additional data may be a single numeric value that is the output of a formula (e.g., total revenue value, sum of a range of cell values, average value over a range of cell values, etc.). In still other examples, additional data may be represented as an array or vector of data, as well as any other primitive type (strings, numbers, etc.).

As should be appreciated, in some aspects, an audio file itself may be represented by a compound data type. For example, as described above, an audio file may comprise audio data (e.g., modulated data) and associated metadata (e.g., including audio attributes). More specifically, as described above, audio attributes may be described in terms of attribute-value pairs and/or attribute-type pairs and/or may be organized in any suitable structured format, e.g., an array of values, a record with an array of fields, a table, an array of vectors, etc. For example, some audio attributes may have a type and a value, e.g., for attribute "bitrate," values may include one of "96 kilobits per second (Kbps)," "64 Kbps," "128 Kbps," "320 Kbps," etc., while a type may be "variable bitrate, VBR" or "constant bitrate, CBR." Similarly, for attribute "channel," a type may be one of "stereo" or "mono," while a value may be one of: "channel 1," "channel 2," "channel 3," etc. Other audio attributes are more commonly associated with values, e.g., for attribute "resolution," values may be one of "8-bit" or "16-bit"; for attribute "sampling rate," values may be one of "44.1 kHz" or "48 kHz"; for attribute "duration," values may be in any appropriate unit, e.g., "21:04 minutes," "1:02 seconds," "1:04 hours," etc. Still other audio attributes may be primarily associated with a type, e.g., for attribute "codec," types may be one of: "MP3," "AAC," "OGG," "FLAC," etc. Thus, an audio file may be represented by a compound data type in which the audio data and the audio attributes are stored in (or referenced by) a structured format. In aspects, an audio file represented by a compound data type may be associated with a cell.

In further aspects, the audio file, including audio data (e.g., digitally modulated audio signals) and audio attributes (e.g., attribute-value pairs and/or attribute-type pairs corresponding to audio attributes, as described above), may be associated with additional data (e.g., data describing content of the audio file, a text transcription of the audio file, represented by arrays, vectors, etc.) in a single compound data type.

For example, consider an audio file of a conversation. In this case, the audio file may include audio data (e.g., digitally modulated audio signals) for storing and playing the audio file and associated metadata including audio attributes (e.g., attribute-value pairs and/or attribute-type pairs) defining aspects of the audio file, such as bitrate, channel, volume, pitch, etc. In examples, additional data may describe or be related to the content of the audio file, such as sound recognition data (e.g., identifying a dog barking, a bird chirping, etc.) voice recognition data (e.g., identifying various speakers), which speaker talked the most, time stamps for statements made by each speaker, etc. In this case, the additional data may be represented by attribute-value pairs (e.g., content attributes). For instance, attribute "speaker 1" may have a value of "Charles"; attribute "speaker 2" may have a value of "Sarah"; attribute "duration 1" may have a value of "10:03 minutes"; and attribute "duration 2" may have a value of "3:07 minutes"; etc.

Further still, the additional data may be described by formatting attributes that may be represented by attribute-value pairs. For example, where the additional data is a text transcription of an audio file, an attribute "font size" may have a value "11 pt.," either automatically or by user selection; an attribute "font color" may have a value "red," either automatically or by user selection; an attribute "font" may have a value "Calibri," either automatically or by user selection; etc. Furthermore, layout attributes may define a relative arrangement and/or dynamic display of a visual representation of an audio file, audio attributes and/or additional data. For instance, layout attributes may define how to display data (e.g., visual representation of the audio file displayed above, below, to the left or the right of additional data, etc.) and/or which data should be dynamically displayed as a cell is resized (e.g., audio icon displayed in small cell, with more data progressively displayed as the cell is enlarged). Layout attributes may also be defined in terms of attribute-value pairs, e.g., an attribute "alignment" may have value "top" or "left"; an attribute "progressive display" may have numerical values in order of priority such as 1-10, and the like.

Based on the above examples, hybrid component 114 may create a compound data type including the audio data (e.g., digitally modulated audio signals), audio attributes (e.g., attribute-value pairs describing the audio file), additional data (e.g., including attribute-value pairs, arrays, vectors, etc., corresponding to content and/or formatting of the additional data) and/or layout attributes (e.g., attribute-value pairs describing relative alignment or progressive display of the visual representation and additional data) in a structured format. In some aspects, rather than the compound data type including the actual data representing the audio data, audio attributes, additional data (including content and/or formatting attributes) and/or layout attributes, the compound data type may include an array of fields with references or pointers to the actual data, which may be stored as a record in any suitable database or storage location. As should be appreciated, while alphanumeric data has been discussed above, different types of additional data (e.g., chart data, video data, image data, etc.) may be described by different sets of attribute-value pairs but may also be represented within the structured format of a compound data type.

In aspects, when a compound data type is associated with a cell, all or some portion of the data represented by the compound data type may be displayed within the cell. For example, a visual representation of an audio file (e.g., icon, waveform representation, etc.) may be displayed in the same cell with additional data describing the content of the audio file (e.g., data depicting the speakers, speaking duration, text transcription of the conversation, etc.). In some aspects, while audio attributes may be included in the compound data type, the audio attributes may not be displayed in the cell with the visual representation and additional data. Rather, in aspects, audio attributes may be retrieved from the compound data type and displayed upon a user selection (e.g., right click on the visual representation of the audio file). As will be described further below, UX component 122 may display UI controls in a ribbon, toolbar, popup menu, etc., for listening to the audio file (e.g., play, fast forward, pause, rewind, etc.), viewing or manipulating audio data (e.g., for audio processing), viewing or manipulating audio attributes (e.g., pitch, volume, speed, etc.), selecting audio attributes for display (e.g., volume), selecting layouts for display of the visual representation with the additional data in a cell (e.g., visual representation displayed adjacent text on left or right, visual representation displayed above or below text, text wrapping visual representation, text displayed over visual representation, and the like).

Transcription component 116 may operate in various ways to convert an audio file into alphanumeric or symbolic data and/or to create an audio file from alphanumeric or symbolic data. In some aspects, transcription component 116 may be hosted by a service in communication with spreadsheet application 110. In other aspects, transcription component 116 may execute locally. For example, an audio file of speech may be converted into a text transcription, which is a textual representation of each word or sound in the audio file. Alternatively, an audio file of music may be converted into a musical transcription, including musical notes, bars, frames, and/or musical notations, representing the music of the audio file. Conversely, a textual document may be converted into an audio file, e.g., spoken words may be generated that correspond to the text of the document. Additionally, a musical score may be converted into an audio file, e.g., sound waves representative of the musical score. Moreover, algorithms may be used to convert raw numerical data into an audio file, such as converting different numbers or events to sounds with different pitch. Additional processing may be enabled beyond a simple transcription from note to note; for example, transposing or auto-tuning may be provided, which require additional rules to be applied on a per 'note' and/or 'phrase' basis and mapping to an appropriate 'scale' for playback.

In still further aspects, e.g., for low vision users, transcription (e.g., text-to-speech) of data within cells of the spreadsheet may be performed and the data may be "played" for the user at any time. In this regard, a spreadsheet may be converted into speech on a cell-by-cell basis, by groups of cells, or globally across the spreadsheet. This functionality marks a significant advance over traditional screen readers. For instance, an audio file may be created to convert data within a cell to speech and the audio file may be associated with the cell. In this case, both the original data and the audio file may be associated with a single cell and a compound data type may be created to store the different types of data, as detailed above. In some aspects, an audio file may be created for each cell containing data within the spreadsheet. To further improve user experience, particularly for low vision users, the spreadsheet may be customized to associate sounds with colors, numbers, trends, or any other aspect of a spreadsheet.

Similarly, by transcribing alphanumeric or other data into an audio file and associating the audio file with a cell, a spreadsheet application becomes able to read its own data. For instance, when a condition is met within the spreadsheet (e.g., a revenue number hits a threshold value, or orders for a product hit a threshold number, etc.), an audio file may be generated and sent in an email, voicemail, text, etc., or may be associated with the spreadsheet such that the audio file plays the next time the spreadsheet application is opened. When the audio file is changed using a calculation function, an updated audio file may be generated and sent.

In some examples, the audio file may be a notification (e.g., revenue hit "x"), a reminder (e.g., orders hit 500 units, remember to order boxes for shipping), an encouragement (e.g., "Way to go!" sent to a sales team upon hitting sales goal), or any other message. Further, the calculation functions may be able to edit the content of the audio file based on additional data. For example, if the original audio file includes information that orders hit 500 units, remember to order boxes for shipping, an updated audio file generated by a calculation function may state that orders hit 600 and issue another reminder.

In this way, a functionality of a digital assistant may be implemented using spreadsheet logic. In further aspects, transcription component 116 may be capable of converting an audio file into any suitable data format and for converting a data format into any suitable audio file.

In aspects, attribute component 118 may retrieve parameters for each audio file associated with a spreadsheet. As detailed above, these parameters may include audio data (e.g., digital data encoding the sound), audio attributes (e.g., frequency, amplitude, sampling rate, codec, etc.), audio specifications (e.g., bitrate, volume, pitch, speed, channel, audio effects, etc.) and/or the audio file (e.g., author, creation date and/or time, file name, file size, duration, etc.).

Once received, the parameters may be provided to a calculation function that alters one or more playback properties of the audio file and/or alters the content of the audio file. In some aspects, attribute component 118 may retrieve parameters from a compound data type and the parameters of the compound data type, including the additional data, may be altered or changed.

For example, attribute component 118 may retrieve audio data, audio attributes, additional data, and/or layout attributes from a compound data type. In aspects, attribute component 118 may retrieve parameters for an audio file and/or additional data at any time, for example, in response to a selection to associate the audio file with a spreadsheet, in response to a selection to manipulate the audio file, in response to a selection to perform a spreadsheet operation, in response to a selection to perform a calculation, and the like.

Calculation component 120 may perform operations and calculation functions on audio files associated with cells of a spreadsheet. As discussed above, once the parameters of the audio file are received, one or more calculation functions may be performed on the parameters to alter or otherwise update the audio file. In some instances, the calculation function generates a new audio file with the updated content and parameters. For example, if the updated audio file is a clip of the original, a time parameter of the audio file, in addition to other parameters, may be updated. In other implementations, the original audio file, and it associated data, is overwritten and replaced as a result of the calculation function.

The following description of functions is for example purposes only and should not be seen as limiting. It is contemplated that additional functions may be used to obtain parameters of an audio file. Further, once the parameters are received, one or more calculation functions may be executed on the data associated with the parameters. In some embodiments, when an audio file is updated using a calculation function, cells within the spreadsheet (or other operations, calculations and/or functions) that depend from or are precedents to the updated audio file, may be notified and updated accordingly. Thus, the various operations and calculations may be chained together such all cells and other associated data may be updated when an associated cell (e.g., the cell containing the audio file) is updated. Further, each of the functions below may be executed in response to certain conditions in various cells of the spreadsheet being met (e.g., the number of sales exceeds a threshold in a given time period).

In one example a "pitch function" or operation may be used to return a value that represents a pitch of the audio file. The calculation component 120 may then alter the pitch of the audio file using one or more calculations.

In another example, a "transform sound function" may send the audio file to a third party service with a list of parameters that are to be transformed. Once the audio file is transformed, the function may receive the updated audio. The updated audio may then be provided in the spreadsheet application. One or more calculations or other operations (e.g., transcription) may then be executed on the updated audio.

In yet another example, a "speed function" may be used to adjust the speed of playback. A "volume function" may adjust the volume of the playback. A "direction function" may alter the direction (e.g., forward or backward) of the playback. Although not specifically mentioned, other playback properties of the audio file may be altered or changed by various functions.

Other functions calculation functions may alter the content of the audio file. For example, the calculation component 120 may utilize a "clip function" that generates a new clip from the audio file. The clip function can create a new begging point and ending point of the audio file, by using some search criteria (e.g., start and end time, specific word or phrase, and so on). In instances in which the audio of the audio file was transcribed, the calculation functions may also update the transcription or otherwise cause the transcription component 116 to update the transcribed portion of the audio to reflect the updated audio file.

A "play from" function may be used to specify which portion of the audio file should be played back. In some instances, this function does not create a new audio file but simply initiates playback at the specified time. In some instances, the play from function may take one or more audio parameters as values and initiate playback from that point. For example, if an audio file indicates that "speaker 2—Sarah" playback may be initiated when Sarah begins speaking.

In another embodiment, a "to array" function returns an array of clips from the original audio file. In other instances, this function may return an array of notes or text associated with the audio file. In some instances, one or more parameters associated with this function may be used to specify the length of the clips, the format of the clips, the spacing between the clips and so on.

The calc engine may also provide a "to transcript" function that pulls all voice data from an audio file into a transcript format. This information may then be provided in one or more cells. As previously discussed, if the audio file is subsequently edited, the transcription may also be automatically updated by the function.

A "normalize function" may normalize one or more playback properties of an audio file. This function may produce a new audio file or overwrite an existing audio file. In yet another embodiment, a "play function" may cause the audio file to initiate playback at a specified point.

In each of these examples, a new audio file may be created or the original audio file may be updated. Additionally, when the audio file is updated, cells and other data associated with the audio file may also be automatically updated.

In addition to the functions described above, the calculation functions may generate a new audio file by concatenating two different audio files together, overlaying the audio files and so on. A "sum function" may be used to append sounds together in serial to form a new audio file. A "split function" may split the audio file into different segments. In addition, various operators (e.g., +, −, *, /, etc.) may be used to alter the parameters of the audio file or otherwise change the content of the audio file.

As discussed above, as the parameters of the audio file are changed or updated, other spreadsheet data or cells that are associated with the audio file may also be updated. For example, if a transcript of an audio file was generated and placed in a cell and the audio file was subsequently broken into clips, the transcript contained in the cell may also be updated to correspond to the clip of the audio file.

The calculation component 120 may also perform operations on a spreadsheet based on attributes of audio files associated with one or more cells. For example, a user may select an operation to apply to a visual representation of an audio file (e.g., "fit to cell," "fill cell," etc.). For example, in order to fit a visual representation to a cell, attributes of the visual representation (e.g., height, width) may automatically be adjusted to coincide with a size of a cell. In some examples, a visual representation of an audio file may be fit (or sized) to coincide with both a cell height and a cell width (e.g., for "fit to cell" or "fill cell").

Alternatively, the visual representation may be fit to coincide with one of a cell height (e.g., "fit vertically") or a cell width (e.g., "fit horizontally"). Similarly, when a cell is resized, calculation component 120 may resize a visual representation of an audio file associated with the resized cell, either automatically or by a user selection. As should be appreciated, the above examples are not intended to be exhaustive and a visual representation may be fit to a cell, resized with a cell, or applied as fill by any suitable means, either automatically or by user selection.

Alternatively, calculation component 120 may fit the cell to a visual representation of an audio file such that the cell conforms to a size of the visual representation. In this case, cell attributes (e.g., a cell height and/or a cell width) may automatically be adjusted to coincide with a size of the visual representation. Furthermore, other cells within a row and/or a column associated with the re-fit cell may also conform to the height and/or width dimensions of the visual representation. As should be appreciated, the examples described above are not intended to be exhaustive and a cell may be fit to a visual representation by any suitable means, either automatically or by user selection.

The calculation component 120 may also execute one or more calculation functions on the additional data contained in the compound data type. The additional data may be changed as a result of a calculation function being performed on the associated audio file. In other embodiments, the additional data may be changed or altered by the calculation function even if the associated audio file is not.

In other aspects, audio attributes, audio data, etc., may be surfaced in a user interface (e.g., by UX component 122) and calculation component 120 may perform operations in response to a user selection. For example, calculation component 120 may receive a selection to change a state of an audio file. As used herein, a "state of an audio file" may refer to a type of association of the audio file with a cell and/or spreadsheet, e.g., anchored, floating, arrayed, background, etc. Changing the state of an audio file may involve converting the audio file from one state to another, e.g., from anchored to floating, from arrayed to independent, from background to foreground, from background to independent, from floating to anchored, and the like.

Calculation component 120 may also perform any number of operations on audio data and/or audio attributes in addition to the functions described above. For example, calculation component 120 may allow calculations or operations on an audio file, such as play, pause, stop, fast forward, rewind, etc. Each of these playback properties may be implemented in response to certain conditions being met. Additionally, calculation component 120 may allow calculations or operations on audio attributes, such as adjusting pitch, volume, speed, channel, resolution, and the like.

UX component 122 may communicate with calculation component 120 to provide one or more user interfaces for exposing available calculation functions or other operations for manipulating audio data and/or audio attributes. As used herein, the term "expose" refers to providing access for user selection and/or input. Selections and/or inputs for operations may be received by gesture, touch, mouse input, keyboard input, etc. For example, UI controls may be provided for listening to an audio file from within a spreadsheet, e.g., UI controls such as "play," "fast forward," "stop," "rewind," and "pause."

Additionally, UX component 122 may provide UI controls for selecting fit and resize operations for performing on a visual representation of an audio file, as described above. UI controls may also be provided for changing a state of an audio file, for example, from anchored to floating or, conversely, from floating to anchored, and the like.

Additionally or alternatively, a visual representation of an audio file may be "popped out" from background to being displayed independently in a cell. Further, UI controls may be provided for manipulating audio data and/or audio attributes. For instance, UI controls may be provided for manipulating audio data, e.g., for splicing of an audio file, changing a compression format, etc., and UI controls may be provided for manipulating audio attributes, e.g., adjusting pitch, volume, speed, channel, resolution, and the like. As should be appreciated, UX component 122 may provide any number of user interfaces (e.g., dropdown menus, popup menus, ribbons, toolbars, etc.) for exposing operations to manipulate audio data and/or audio attributes.

For cells associated with more complex objects, e.g., an array of audio files or one or more audio files with additional data, UX component 122 may provide additional functionality and UI controls. For instance, UI controls may be provided for selecting a layout (or alignment) between a visual representation of an audio file and additional data within a single cell, e.g., a visual representation may be displayed above, below, to the right or left of, or wrapped by additional data, etc. Additionally, UX component 122 may display various views of data associated with a compound data type, e.g., display of data may vary based on cell size and/or various user interfaces may be provided. For instance, a minimal amount of data may be displayed in a small cell (e.g., an icon representation of the audio file), but successively more data may be displayed as the cell is enlarged (e.g., waveform representation of audio file, names of parties to a conversation, a text transcription of the audio file, various audio attributes of the audio file, etc.). Additionally or alternatively, UX component 122 may provide a popup window for displaying data associated with the compound data type and/or a settings tool bar for manipulating data associated with the compound data type. As should be appreciated, UX component 122 may retrieve and surface more or less data associated with a compound data type based on user preference or selection.

Similarly, where multiple audio files are associated with a single cell, UX component 122 may provide a UI element for displaying an array of audio files. For example, in a default collapsed view (e.g., collapsed UI element), a visual representation of one of the array of audio files may be displayed within the cell. In some aspects, in the collapsed view, UX component 122 may provide a timer to cycle display of a visual representation for each audio file within the cell. The collapsed UI element may further include a visual indication that multiple audio files are associated with the cell (e.g., a stack indicator, scroll control, etc.). In response to selection of a UI control (e.g., right click, button, menu, etc.), the collapsed view may expand to reveal visual representations for each of the array of audio files. Visual representations for the array of audio files may be displayed within an expanded UI element in any suitable arrangement (e.g., linear, carousel, grid, etc.) for viewing and interacting with the array of audio files. For instance, an audio file may be selected and removed from the array of audio files associated with a first cell and cut/pasted or drag/dropped into a second cell, or an audio file may be deleted from the array altogether. In some cases, the whole array may be "spilled" into a range of cells, e.g., with each audio file spilling into (or being associated with) a different cell of the range of cells. Additionally, a new audio file may be added to an array of audio files by opening the expanded UI element (e.g., by right click activation) and by inserting the new audio file into a selected position within the array. In some instances, the visual representation of the audio file provided by the UX component 122 may also be updated based on the change to the audio file. For example, the size of the visual representation may change when a calculation function generates clips of the audio file. In some instances, the size of the visual representation may represent a total time of the clip. As detailed above, any number of different user interfaces may be provided by UX component 122 for viewing and/or manipulating audio data, audio attributes and/or additional data.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
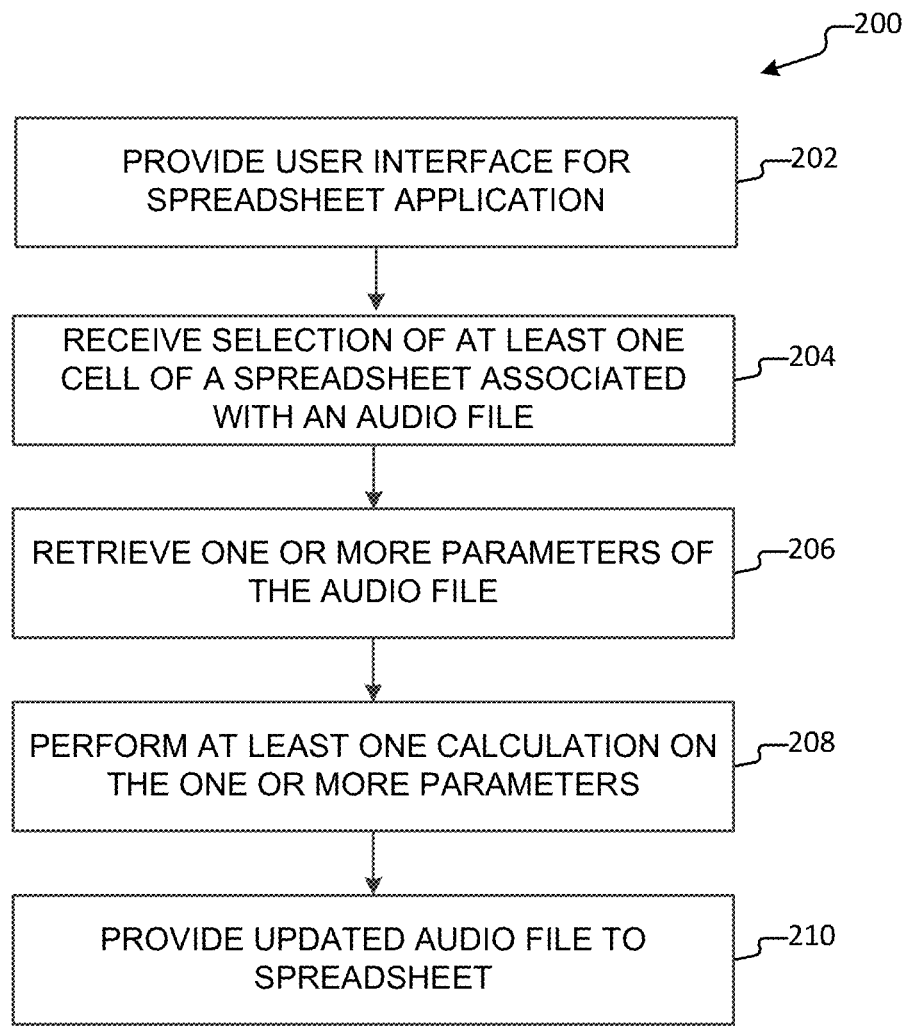
FIG. 2 illustrates a method for updating an audio file in a spreadsheet using one or more calculation functions, according to an example embodiment.

FIG. 2 illustrates a method for performing one or more calculations on an audio file that is associated with one or more cells of a spreadsheet, according to an example embodiment.

Method 200 begins with provide interface operation 202, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., associate component 112, hybrid component 114, transcription component 116, attribute component 118, and calculation component 120) to associate one or more audio files with one or more cells of the spreadsheet.

Flow then proceeds to operation 204 in which at least one cell of a spreadsheet having an associated audio file, may be selected. The selection may be made either automatically (e.g., based on a function) or by user selection. That is, in some aspects, calculation functions may call (or select) a cell without requiring user input.

In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like.

When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

Once the audio file has been selected, flow then proceeds to operation 206 and one or more parameters of the audio file are retrieved. As explained above, the parameters of the audio file may include audio data, audio attributes, audio specifications, and/or the audio file. In some instances, the parameters of the audio file are retrieved by an attribute component (e.g., attribute component 118) of a spreadsheet application (e.g., spreadsheet application 110). In some aspects, audio data may be retrieved from the audio file and audio attributes may be retrieved from metadata appended to the audio file. In other aspects, parameters (e.g., audio data, audio attributes, content attributes, additional data, layout attributes, etc.) may be retrieved from a data structure of a compound data type.

Once the parameters of the audio file are retrieved, flow proceeds to operation 208 and at least one calculation function is performed on the parameters of the audio file. In aspects, operation 208 may be performed by a calculation component (e.g., calculation component 120) of a spreadsheet application (e.g., spreadsheet application 110). The calculation function may alter one or more of the parameters. As a result, the content and/or one or more playback properties of the audio file are changed.

For example, the calculation function may be applied to the audio file when certain conditions are met. As such, playback of an audio file may occur at a certain starting point based on sales goals hitting a certain threshold).

When a calculation function is performed on an audio file, a new, updated audio file may be produced and placed or otherwise associated with a new cell. In other embodiments, the original audio file may be updated and be maintained in its original cell (or placed in, or associated with, a new cell).

When the audio file is changed, additional data in spreadsheet may also need to be updated. For example, if an audio file is transcribed and the transcription is generated and placed in a cell, the transcription may be updated when the audio file is changed as a result of the calculation function. Further, in instances where the audio file is dependent on values from one or more parent cells, and the data in the parent cell is changed, the audio file may be automatically updated accordingly.

Although playback properties of the audio file are specifically mentioned, other parameters of the audio file may be altered by a calculation function. In addition, the visual representation of the audio file may also be altered by the calculation functions.

Once the audio file is updated, flow proceeds to operation 210 and the updated audio file is provided on the spreadsheet. In some instances, a UX component (e.g., UX component 122) of a spreadsheet application (e.g., spreadsheet application 110) is used to provide the audio file on the spreadsheet.

In some aspects, display options for visual representations of the plurality of audio files may be provided, e.g., display configurations such as linear, carousel, grid, etc. In some cases, while the plurality of audio files may be associated with a single cell, display of visual representations for the plurality of audio file may overlay additional cells of the spreadsheet. For example, in a linear configuration, visual representations may be displayed horizontally (e.g., overlaying portions of a row or rows adjacent to or near the associated cell(s)) or may be displayed vertically (e.g., overlaying portions of a column or columns adjacent to or near the associated cell(s)). In a grid or carousel configuration, visual representations may overlay portions of a block of cells (e.g., including both rows and columns) adjacent to or near the associated cell(s). As should be appreciated, other configurations for displaying visual representations for a plurality of audio files are possible.

In further aspects, the UX component (e.g., UX component 122) may provide a user interface that enables a user to display, interact with and/or manipulate the audio file.

As should be appreciated, operations 202-210 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
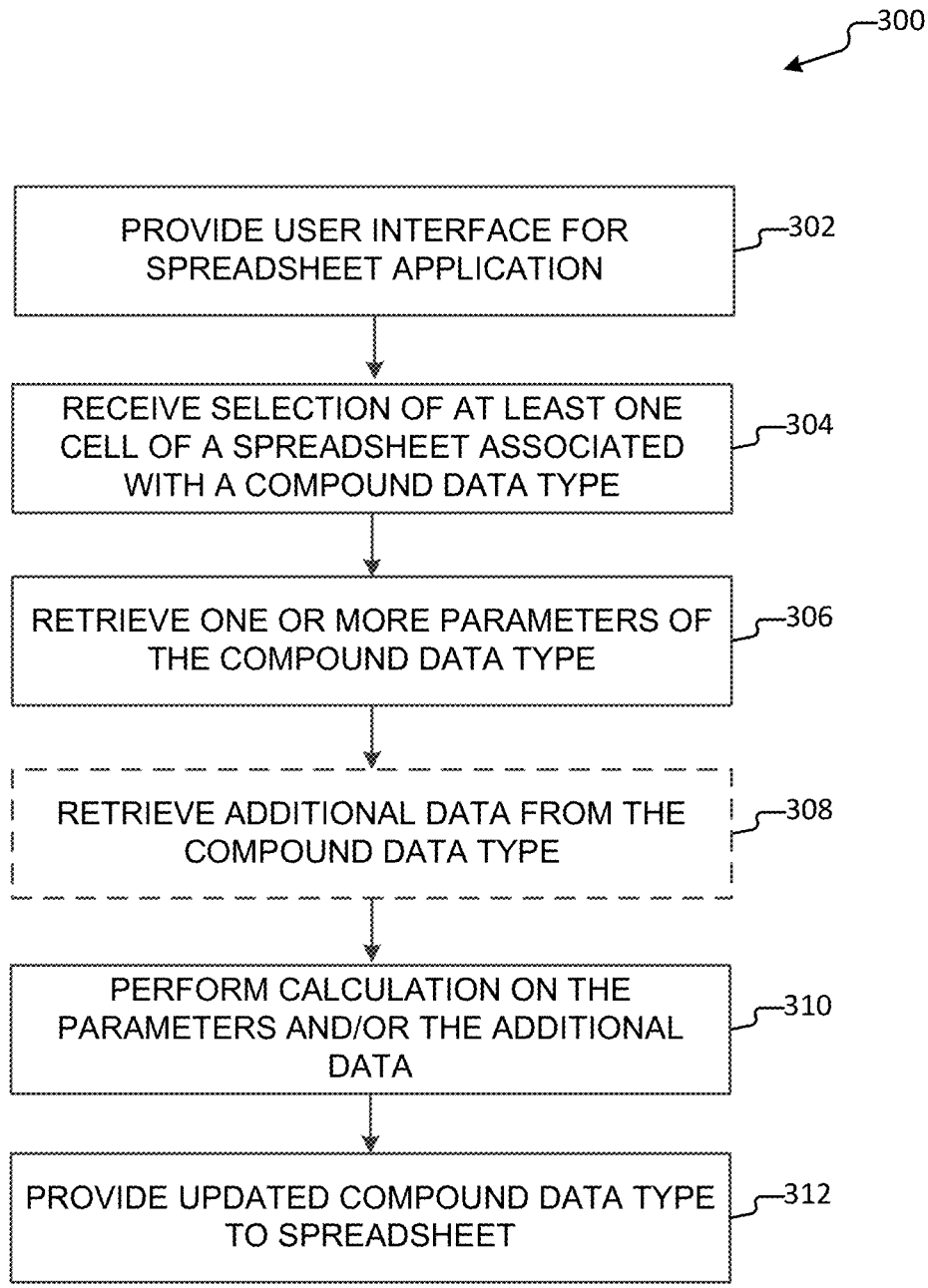
FIG. 3 illustrates a method for performing calculations on data within a compound data type associated with a cell of a spreadsheet, according to an example embodiment.

FIG. 3 illustrates a method for performing one or more calculations on an audio file and (optionally) additional data associated with compound data type in a spreadsheet, according to an example embodiment.

Method 300 begins with provide interface operation 302, where a spreadsheet application may provide (or cause to be provided) a user interface to a user. For example, similar to provide interface operation 202, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., associate component 112, hybrid component 114, transcription component 116, attribute component 118, and calculation component 120) to associate one or more audio files and additional data with one or more cells of the spreadsheet.

Flow then proceeds to operation 304 in which a selection of at least once cell associated with a compound data type is received. This operation is similar to operation 204 described above. Accordingly, at least one cell may be selected, either automatically (e.g., based on a calculation or function) or by user selection. Cells may be selected by highlighting or otherwise identifying the cell or range of cells using a gesture, touch, mouse click, keyboard input, and the like.

Flow then proceeds to operation 306 in which one or more parameters of the compound data type are retrieved. As described above, a compound data type may be an object structured to include or reference the audio file and additional data. In some aspects, additional data may be described in terms of attribute-value pairs.

In some embodiments, one or more functions may retrieve one or more parameters associated with the audio file. These parameters includes, but are not limited to, audio data (e.g., digital data encoding the sound), audio attributes that describe the audio data (e.g., frequency, amplitude, sampling rate, codec, etc.), audio specifications (e.g., bitrate, volume, pitch, speed, channel, audio effects, etc.) as well as information about the audio file (e.g., author, creation date and/or time, file name, file size, duration, etc.).

Once the parameters are received, flow may optionally proceed to operation 308 (represented by the dashed line) in which additional data may be retrieved from the compound data type. In some embodiments, the additional data may be a text transcription or a musical transcription of the audio file received from a transcription component of the spreadsheet application. In still other aspects, the additional data may be a numeric value resulting from a function associated with the selected cell. In some cases, the additional data may include alphanumeric data (e.g., textual data, numeric data, formulas, and the like). Alternatively, additional data may include charts, videos, audio files, or any other type of data. As should be appreciated, the additional data may comprise any data in any format.

In some aspects, the additional data may describe or be related to the content of the at least one audio file and may be represented by attribute-value pairs (e.g., content attributes). For instance, referring back to the example of an audio file of a recorded conversation, additional data may include attribute-value pairs such as "speaker 1—Charles"; "speaker 2—Sarah"; "duration 1—10:03 minutes"; and "duration 2—3:07 minutes"; etc. As well, the additional data may be described by formatting attributes that may be represented by attribute-value pairs, e.g., "font size—11 pt."; "font color—red"; "font—Calibri"; etc. In other aspects, the additional data may not necessarily be represented by attribute-value pairs. For instance, the additional data may be a single numeric value that is the output of a formula (e.g., total revenue value, sum of a range of cell values, average value over a range of cell values, etc.). In still other aspects, additional data may be represented as an array or vector of data, as well as any other primitive type (strings, numbers, etc.). Additionally, layout attributes may define a relative arrangement and/or dynamic display of audio data, audio attributes and additional data. For instance, layout attributes may also be defined by attribute-value pairs, e.g., "alignment—top" or "progressive display —1", etc.

Flow then proceeds to operation 310 and a calculation is performed on the parameters of the audio file. In aspects, operation 310 may be similar to operation 208 described above. As such, operation 310 may be performed by a calculation component (e.g., calculation component 120) of a spreadsheet application (e.g., spreadsheet application 110). In some instances, a calculation may also be performed on the additional data that was retrieved in (optional) operation 308.

As previously described, the calculation functions may alter one or more of the parameter values of the audio file and/or the content of the audio file. The changes may include changing playback properties such as speed, direction, pitch, volume etc. of the audio file, changing the content of the audio file, changing starting and ending points of the audio file and so on.

In some instances, the calculation function may be applied to the audio file when certain conditions are met. For example, playback of an audio file may occur at a certain starting point based on a condition being satisfied (e.g., sales goals hitting a certain threshold).

As was also described above, when the audio file or the additional data of the compound data type is changed, other data in spreadsheet may also need to be updated. For example, if an audio file is transcribed and the transcription is generated and placed in a cell, the transcription may be updated when the audio file is changed as a result of the calculation function.

Once the audio file and (optionally) the additional data has been updated using a calculation function, flow proceeds to operation 312 and the updated compound data type is provided to the spreadsheet application. As described above, a user interface may provide the compound data type in the spreadsheet and enable a user to interact with it. In some instances, the audio file and/or the additional data may be displayed as a visual representation.

As should be appreciated, operations 302-312 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
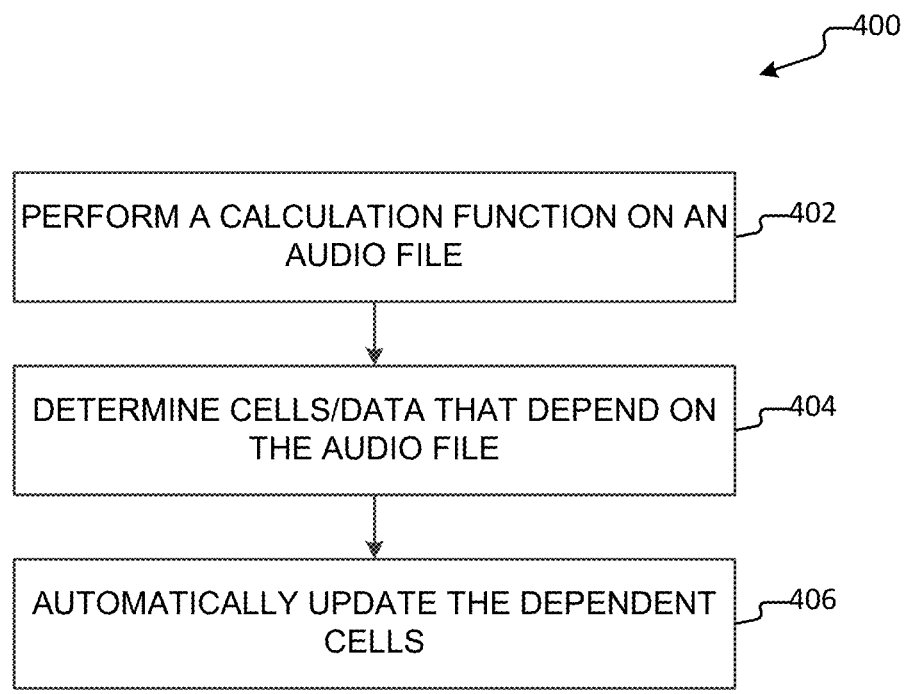
FIG. 4 illustrates a method for updating dependent cells in a spreadsheet when an audio file is updated, according to an example embodiment.

FIG. 4 illustrates a method for automatically updating spreadsheet data in response to an audio file being updated. In some instances, the method 400 described below may be performed after the method 200 and method 300 described above are performed. Further, although method 400 described updating spreadsheet data in response to an audio file being updated, it is also contemplated that an audio file may be automatically updated using a calculation function when data in other cells of the spreadsheet is updated.

Method 400 begins at operation 402 in which a calculation function is performed on an audio file. As discussed above, the calculation function may be used to alter one or more playback properties of the audio file, may be used to merge two different audio files together, may be used to generate one or more clips of the audio file and so on. As also discussed, the calculation function may also be initiated when certain conditions are met, when data in the spreadsheet is altered or updated and so on.

Once the calculation on the audio file has been performed, flow proceeds to operation 404 and a determination is made as to which cells in the spreadsheet, if any, depend from or are otherwise associated with the audio file or the cell that is associated with the audio file. That is, a determination is made as to whether any cells in the spreadsheet application have a dependency on the audio or the cell associated with the image. For example, if a transcription of the audio file was generated and placed in a cell, that cell has a dependency on the cell that contains the audio file.

If dependencies are determined, flow proceeds to operation 406 and the data in the dependent cells is updated. The data in the dependent cells may be updated using one or more functions, operations, and/or calculations. Continuing with the example above, since the transcription was made from the audio file and the audio file was subsequently updated, the transcription may be updated to reflect the updated audio file.

As should be appreciated, operations 402-406 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

Figure 5:
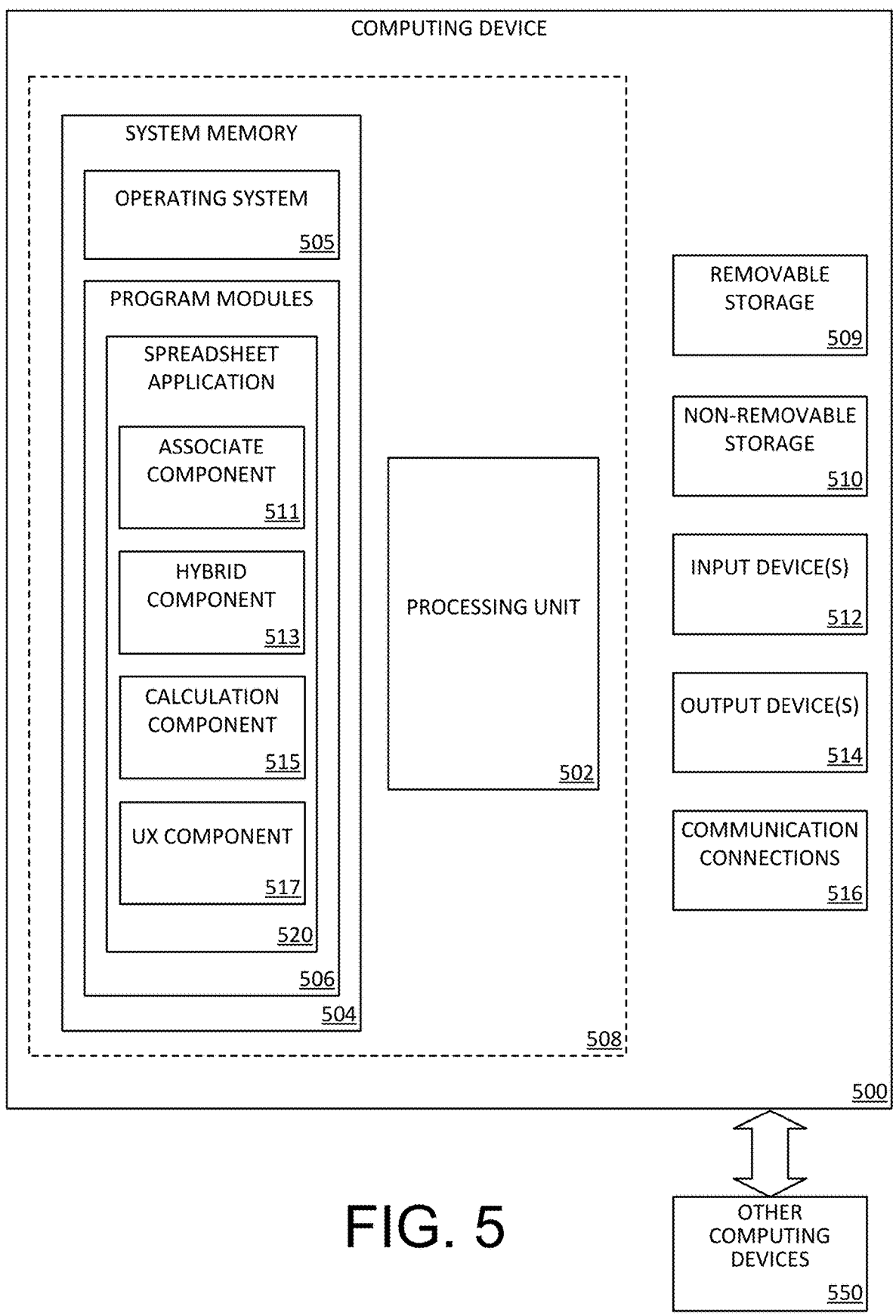
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for implementing a spreadsheet application 520 on a computing device (e.g., server computing device 108 and/or client computing device 104), including computer executable instructions for spreadsheet application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running spreadsheet application 520, such as one or more components with regard to FIG. 1 and, in particular, associate component 511 (e.g., including associate component 52 and/or attribute component 58), hybrid component 513 (e.g., corresponding to hybrid component 54), transcription component 515 (e.g., corresponding to transcription component 56), and/or UX component 517 (e.g., including calculation component 120 and UX component 122).

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., spreadsheet application 520) may perform processes including, but not limited to, the aspects, as described herein. Other program modules that may be used in accordance with aspects of the present disclosure, and in particular for associating audio files with cells of a spreadsheet, may include associate component 511, hybrid component 513, transcription component 515, and/or UX component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
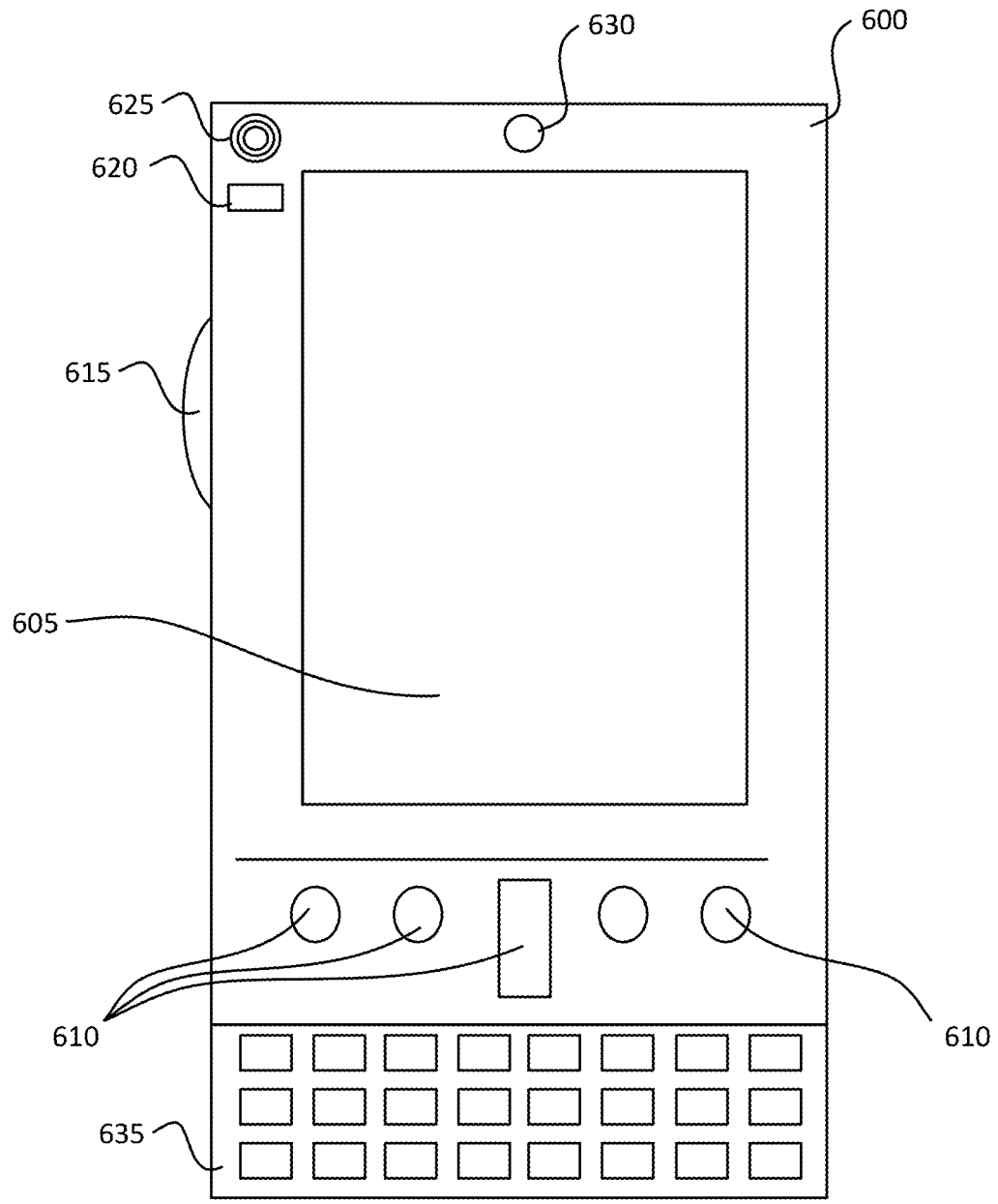
FIGS. 6A and 6B are simplified block diagrams of a mobile computing device with which aspects of the present disclosure may be practiced.
Figure 6B:
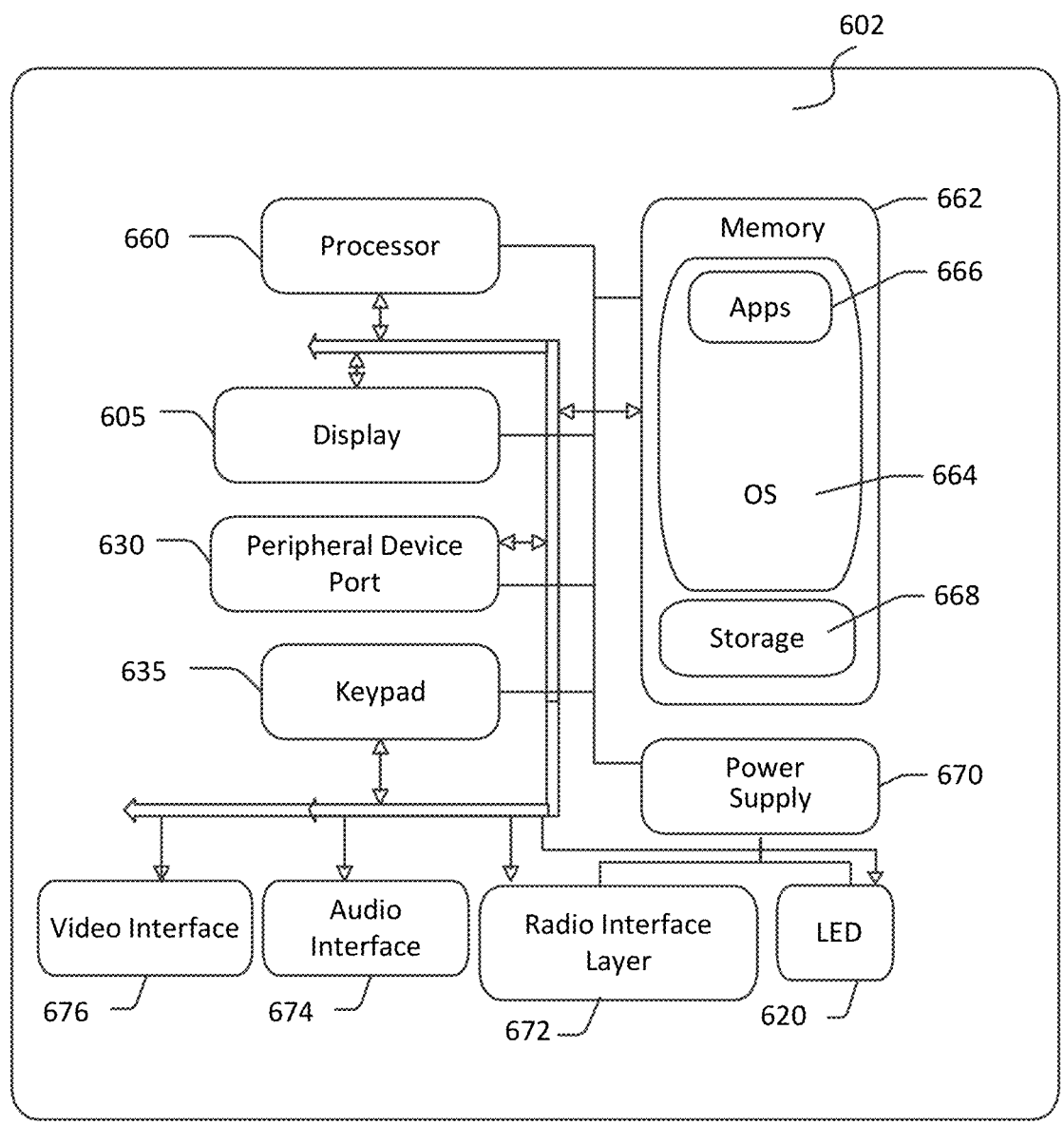

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for associating one or more audio files with one or more cells of a spreadsheet as described herein (e.g., associate component, hybrid component, transcription component, attribute component, calculation component, and/or UX component, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

Figure 7:
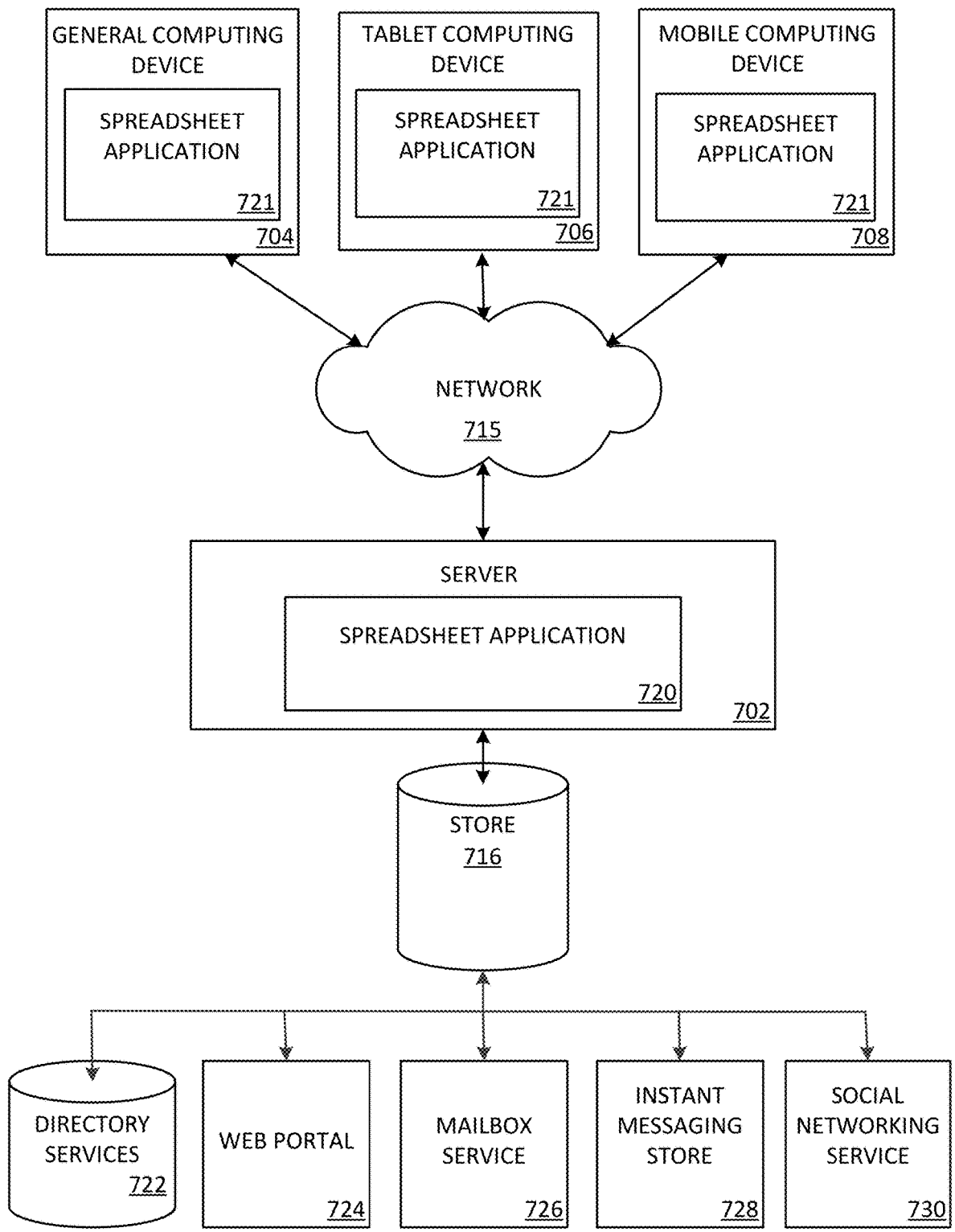
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The spreadsheet application 721 may be employed by a client that communicates with server device 702, and/or the spreadsheet application 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIG. 1 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
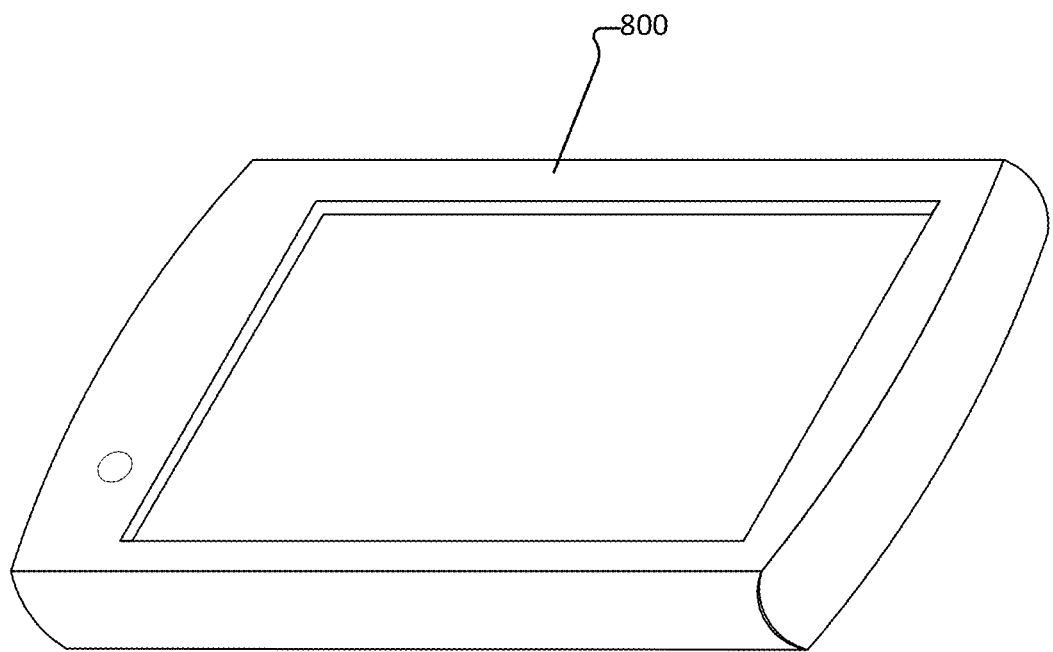
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computing device, comprising:
   at least one processing unit; and
   at least one memory storing computer executable instructions that, when executed by the at least one processing unit, cause the computing device to perform operations comprising:
   receiving an audio file in a first cell of a spreadsheet application executing on the computing device;
   obtaining numeric data from a second cell of the spreadsheet application;
   changing, using a first calculation function provided by the spreadsheet application, a numeric value of a playback property of the audio file using the numeric data from the second cell of the spreadsheet application;
   providing access to the audio file with the changed playback property in the first cell;
   determining a condition of a second calculation function associated with the audio file is satisfied;
   updating the audio file using the second calculation function; and
   automatically playing the updated audio file, wherein:
   the audio file is associated with additional audio data,
   the audio file and the additional audio data include a compound data type,
   calculation is performed on the compound data type using the first calculation function, and
   the compound data type comprises the audio file and the additional audio data in a structured format.

2. The computing device of claim 1, wherein providing the access to the audio file comprises one of:
   displaying a visual representation of the audio file;
   playing the audio file;
   sending the audio file in a message to a user; and
   sending the audio file as a voicemail to the user.

3. The computing device of claim 1, wherein the memory stores the computer executable instructions that, when executed by the at least one processing unit, further cause the computing device to perform an operation comprising updating a cell that is associated with the audio file when the audio file is changed.

4. The computing device of claim 1, wherein the first calculation function adjusts a speed of playback of the audio file.

5. The computing device of claim 1, wherein the first calculation function generates a clip from the audio file.

6. The computing device of claim 1, wherein the audio file is received by one of:
   recording the audio file;
   pasting the audio file into the first cell;
   dropping the audio file into the first cell;
   retrieving the audio file from storage;
   converting a range of values in the spreadsheet application into the audio file;
   converting a document into the audio file; and
   converting a musical score into the audio file.

7. The computing device of claim 1, wherein the first calculation function causes a portion of the audio file to begin a playback at a point that is different than a beginning of the audio file.

8. A method comprising:
   receiving an audio file in a first cell of a spreadsheet application executing on a computing device;
   providing a numeric value of a playback property of the audio file and numeric data from a second cell to a first calculation function of the spreadsheet application;
   changing, using the first calculation function of the spreadsheet application, the numeric value of the playback property of the audio file using the numeric data from the second cell of the spreadsheet application;
   providing access to the audio file with the changed playback property in the first cell;
   determining a condition of a second calculation function associated with the audio file is satisfied;
   updating the audio file using the second calculation function; and
   automatically playing the updated audio file, wherein:
   the audio file is associated with additional audio data,
   the audio file and the additional audio data comprise a compound data type,
   calculation is performed on the compound data type using the first calculation function, and
   the compound data type comprises the audio file and the additional audio data in a structured format.

9. The method of claim 8, further comprising displaying a visual representation of the audio file in the spreadsheet application.

10. The method of claim 8, further comprising providing access to the audio file from the first cell in the spreadsheet application.

11. The method of claim 10, wherein providing the access to the audio file comprises one of:
   providing a user interface with play controls for the audio file;
   sending the audio file in a message to a user; and
   sending the audio file as a voicemail to the user.

12. The method of claim 8, wherein receiving the audio file in the first cell comprises one of:
   embedding the audio file into the first cell in the spreadsheet application; and
   anchoring the audio file to the first cell in the spreadsheet application.

13. The method of claim 8, wherein the first calculation function returns an array of clips of the audio file.

14. The method of claim 8, wherein the first calculation function causes a playback of the audio file from a first point to a second point that is different than a beginning point of the audio file and an ending point of the audio file.

15. The method of claim 8, wherein the first calculation function adjusts a playback speed of the audio file.

16. A computing device, comprising:
   a processing unit; and
   a memory storing computer executable instructions that, when executed by the processing unit, cause the computing device to:
   receive an audio file in a first cell of a spreadsheet application executing on the computing device:
   provide a numeric value of a playback property of the audio file and numeric data from a second cell to a first calculation function of the spreadsheet application;
   change, using the first calculation function of the spreadsheet application, the numeric value of the playback property of the audio file using the numeric data from the second cell of the spreadsheet application;
   provide access to the audio file with the changed playback property in the first cell;
   determine a condition of a second calculation function associated with the audio file is satisfied;
   update the audio file using the second calculation function; and
   automatically play the updated audio file, wherein:
   the audio file is associated with additional audio data,
   the audio file and the additional audio data comprise a compound data type, calculation is performed on the compound data type using the first calculation function, and
   the compound data type comprises the audio file and the additional audio data in a structured format.

17. The computing device of claim 16, wherein the memory stores the computer executable instructions that, when executed by the processing unit, further cause the computing device to display a visual representation of the updated audio file.

18. The computing device of claim 16, wherein the memory stores the computer executable instructions that, when executed by the processing unit, further cause the computing device to update a cell associated with the audio file when calculation is performed on the audio file using the first calculation function.

* * * * *